US012634540B2

(12) United States Patent
Harvey et al.

(10) Patent No.: US 12,634,540 B2
(45) Date of Patent: **\*May 19, 2026**

(54) CUSTOMIZED OPTIONS FOR CONSUMPTION OF CONTENT

(71) Applicant: Adeia Media Holdings LLC, San Jose, CA (US)

(72) Inventors: John Harvey, Wynnewood, PA (US); Michael Mattozzi, Media, PA (US); Matthew Hawthorne, Los Gatos, CA (US); Jeremy Volkman, Seattle, WA (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,146

(22) Filed: Dec. 28, 2023

(65) Prior Publication Data

US 2024/0292045 A1      Aug. 29, 2024

Related U.S. Application Data

(63) Continuation of application No. 17/841,296, filed on Jun. 15, 2022, now Pat. No. 11,902,609, which is a continuation of application No. 17/137,735, filed on Dec. 30, 2020, now Pat. No. 11,395,024, which is a continuation of application No. 16/172,392, filed on Oct. 26, 2018, now Pat. No. 10,931,992, which is a continuation of application No. 13/559,341, filed on Jul. 26, 2012, now Pat. No. 10,158,898.

(51) Int. Cl.
| | |
|---|---|
| *H04N 21/258* | (2011.01) |
| *H04N 21/442* | (2011.01) |
| *H04N 21/482* | (2011.01) |

(52) U.S. Cl.
CPC . *H04N 21/25891* (2013.01); *H04N 21/44222* (2013.01); *H04N 21/4826* (2013.01)

(58) Field of Classification Search
CPC ....... H04N 21/25891; H04N 21/44222; H04N 21/4826
USPC ......................................................... 709/226
See application file for complete search history.

(56) References Cited

U.S. PATENT DOCUMENTS

| | | | |
|---|---|---|---|
| 6,850,252 | B1 | 2/2005 | Hoffberg |
| 6,904,408 | B1 | 6/2005 | McCarthy et al. |
| 7,035,855 | B1 | 4/2006 | Kilger et al. |

(Continued)

FOREIGN PATENT DOCUMENTS

| | | |
|---|---|---|
| CN | 106558275 A | 4/2017 |
| EP | 2064887 B2 | 4/2022 |

(Continued)

OTHER PUBLICATIONS

Davidson J., et al., "The YouTube video recommendation system", Proceedings of the 2010 ACM Conference on Recommender Systems, RecSys, Sep. 26-30, 2010, pp. 293-296.

(Continued)

*Primary Examiner* — Ruolei Zong
(74) *Attorney, Agent, or Firm* — HG Law LLP

(57) ABSTRACT

Systems and methods for consuming content. A computing device may receive data. The computing device may determine an inference. The computing device may manage content. The computing device may manage content based on the inference.

20 Claims, 8 Drawing Sheets

(56)         References Cited

U.S. PATENT DOCUMENTS

| | | | |
|---|---|---|---|
| 7,051,352 B1 | 5/2006 | Schaffer | |
| 7,185,065 B1 | 2/2007 | Holtzman et al. | |
| 7,188,355 B1 | 3/2007 | Prokopenko et al. | |
| 7,219,123 B1* | 5/2007 | Fiechter | G10L 15/26 |
| | | | 715/728 |
| 7,421,725 B2 | 9/2008 | Hane et al. | |
| 7,447,695 B2 | 11/2008 | Goto | |
| 7,447,696 B1 | 11/2008 | Tsuji | |
| 7,707,249 B2 | 4/2010 | Spataro et al. | |
| 7,734,630 B2 | 6/2010 | Kato | |
| 7,904,924 B1 | 3/2011 | De et al. | |
| 7,987,182 B2 | 7/2011 | Slothouber et al. | |
| 8,027,240 B2 | 9/2011 | Kuroda | |
| 8,099,322 B2 | 1/2012 | Watanabe et al. | |
| 8,204,957 B2 | 6/2012 | Graham et al. | |
| 8,468,099 B2 | 6/2013 | Headings et al. | |
| 8,484,292 B2 | 7/2013 | Spataro et al. | |
| 8,484,685 B2 | 7/2013 | White | |
| 8,589,106 B2 | 11/2013 | Engelhardt et al. | |
| 9,264,151 B1 | 2/2016 | Emigh et al. | |
| 9,336,483 B1 | 5/2016 | Abeysooriya et al. | |
| 9,473,730 B1 | 10/2016 | Roy et al. | |
| 9,660,971 B1 | 5/2017 | Latin-Stoermer et al. | |
| 9,715,482 B1 | 7/2017 | Bjorkegren | |
| 9,753,988 B1 | 9/2017 | McGilliard | |
| 10,158,898 B2 | 12/2018 | Harvey et al. | |
| 10,181,129 B2 | 1/2019 | Unser et al. | |
| 10,699,508 B2 | 6/2020 | Yazdani et al. | |
| 10,713,707 B1 | 7/2020 | Scholl et al. | |
| 11,902,609 B2 | 2/2024 | Harvey et al. | |
| 2001/0017978 A1 | 8/2001 | Nagasawa | |
| 2001/0028809 A1 | 10/2001 | Maekawa | |
| 2002/0010620 A1 | 1/2002 | Kowalchuk et al. | |
| 2002/0010859 A1 | 1/2002 | Maeda | |
| 2002/0011567 A1 | 1/2002 | Ozanich | |
| 2002/0018580 A1 | 2/2002 | Maeda | |
| 2002/0024525 A1 | 2/2002 | Ushida | |
| 2002/0062368 A1 | 5/2002 | Holtzman et al. | |
| 2002/0198786 A1 | 12/2002 | Tripp et al. | |
| 2003/0063407 A1* | 4/2003 | Zimmerman | G11B 27/005 |
| | | | 386/E5.052 |
| 2003/0099951 A1 | 5/2003 | Akeson et al. | |
| 2003/0104499 A1 | 6/2003 | Pressman et al. | |
| 2003/0118323 A1 | 6/2003 | Ismail et al. | |
| 2003/0138130 A1 | 7/2003 | Cohen et al. | |
| 2003/0163286 A1 | 8/2003 | Yasugi | |
| 2003/0190602 A1 | 10/2003 | Pressman et al. | |
| 2003/0194224 A1 | 10/2003 | Nagasawa | |
| 2003/0199685 A1 | 10/2003 | Pressman et al. | |
| 2003/0206718 A1 | 11/2003 | Nagasawa | |
| 2003/0233212 A1 | 12/2003 | Von et al. | |
| 2004/0010375 A1 | 1/2004 | Schomacker et al. | |
| 2004/0040040 A1 | 2/2004 | Danker et al. | |
| 2004/0042674 A1 | 3/2004 | Itokawa | |
| 2004/0057514 A1 | 3/2004 | Kishi | |
| 2004/0109734 A1 | 6/2004 | Ooe et al. | |
| 2004/0161132 A1 | 8/2004 | Cohen et al. | |
| 2004/0206882 A1 | 10/2004 | Banks et al. | |
| 2004/0206913 A1 | 10/2004 | Costa et al. | |
| 2004/0206914 A1 | 10/2004 | Schomacker et al. | |
| 2004/0207625 A1 | 10/2004 | Griffin et al. | |
| 2004/0208385 A1 | 10/2004 | Jiang | |
| 2004/0208390 A1 | 10/2004 | Jiang et al. | |
| 2004/0209237 A1 | 10/2004 | Flewelling et al. | |
| 2005/0010390 A1 | 1/2005 | Shimohata | |
| 2005/0094974 A1 | 5/2005 | Nagasawa | |
| 2005/0130224 A1 | 6/2005 | Saito et al. | |
| 2005/0282201 A1 | 12/2005 | Pressman et al. | |
| 2006/0013440 A1 | 1/2006 | Cohen et al. | |
| 2006/0013454 A1 | 1/2006 | Flewelling et al. | |
| 2006/0080161 A1 | 4/2006 | Arnett et al. | |
| 2006/0098953 A1 | 5/2006 | Nagasawa | |
| 2006/0111448 A1 | 5/2006 | Epstein et al. | |
| 2006/0123456 A1 | 6/2006 | Dei | |
| 2006/0195356 A1 | 8/2006 | Nerenhausen et al. | |

| | | | |
|---|---|---|---|
| 2006/0210112 A1 | 9/2006 | Cohen et al. | |
| 2007/0026406 A1 | 2/2007 | El et al. | |
| 2007/0199431 A1 | 8/2007 | Kashioka | |
| 2007/0204118 A1* | 8/2007 | White | H04N 21/4183 |
| | | | 711/159 |
| 2007/0219856 A1 | 9/2007 | Ahmad-Taylor | |
| 2007/0220552 A1* | 9/2007 | Juster | H04N 21/6582 |
| | | | 348/E5.007 |
| 2007/0244983 A1* | 10/2007 | Berger | H04N 21/47202 |
| | | | 348/E7.071 |
| 2007/0288808 A1 | 12/2007 | Gulas et al. | |
| 2008/0062318 A1 | 3/2008 | Ellis et al. | |
| 2008/0139402 A1 | 6/2008 | Pressman et al. | |
| 2008/0147220 A1 | 6/2008 | Ooe et al. | |
| 2008/0160515 A1 | 7/2008 | Juhl et al. | |
| 2008/0192005 A1 | 8/2008 | Elgoyhen et al. | |
| 2008/0319827 A1* | 12/2008 | Yee | G06Q 30/02 |
| | | | 705/7.29 |
| 2009/0019488 A1 | 1/2009 | Ruiz-Velasco et al. | |
| 2009/0074248 A1 | 3/2009 | Cohen et al. | |
| 2009/0083038 A1 | 3/2009 | Imoto | |
| 2009/0092331 A1 | 4/2009 | Genda et al. | |
| 2009/0106082 A1 | 4/2009 | Senti et al. | |
| 2009/0192794 A1 | 7/2009 | Akamatsu | |
| 2009/0240732 A1* | 9/2009 | Amidon | G06F 3/0482 |
| | | | 707/E17.046 |
| 2009/0248357 A1 | 10/2009 | Abe | |
| 2009/0274339 A9 | 11/2009 | Cohen et al. | |
| 2009/0303176 A1 | 12/2009 | Chen et al. | |
| 2010/0020025 A1 | 1/2010 | Lemort et al. | |
| 2010/0022658 A1 | 1/2010 | Epstein et al. | |
| 2010/0079450 A1 | 4/2010 | Pizlo et al. | |
| 2010/0090971 A1 | 4/2010 | Choi et al. | |
| 2010/0094866 A1 | 4/2010 | Cuttner et al. | |
| 2010/0161379 A1 | 6/2010 | Bene et al. | |
| 2010/0251305 A1 | 9/2010 | Kimble et al. | |
| 2011/0019056 A1 | 1/2011 | Hirsch et al. | |
| 2011/0028160 A1 | 2/2011 | Roeding et al. | |
| 2011/0106584 A1 | 5/2011 | Borthwick et al. | |
| 2011/0110567 A1 | 5/2011 | Jiang | |
| 2011/0158653 A1 | 6/2011 | Mazed | |
| 2011/0222726 A1 | 9/2011 | Ruan | |
| 2011/0231551 A1 | 9/2011 | Hassan et al. | |
| 2011/0289037 A1 | 11/2011 | Tullio et al. | |
| 2012/0030711 A1 | 2/2012 | Rae et al. | |
| 2012/0076283 A1 | 3/2012 | Ajmera et al. | |
| 2012/0110027 A1 | 5/2012 | Falcon | |
| 2012/0158461 A1* | 6/2012 | Aldrey | G06Q 30/0242 |
| | | | 705/7.29 |
| 2012/0296701 A1 | 11/2012 | Breiter | |
| 2013/0018730 A1 | 1/2013 | Morris et al. | |
| 2013/0030822 A1 | 1/2013 | Mikan et al. | |
| 2013/0041758 A1 | 2/2013 | Mikan et al. | |
| 2013/0041759 A1 | 2/2013 | Mikan et al. | |
| 2013/0151527 A1 | 6/2013 | Bruich et al. | |
| 2013/0166690 A1 | 6/2013 | Shatzkamer | |
| 2013/0247091 A1* | 9/2013 | Wong | H04N 21/4147 |
| | | | 725/32 |
| 2013/0268953 A1 | 10/2013 | Nikankin | |
| 2013/0344968 A1 | 12/2013 | Halfteck et al. | |
| 2014/0006951 A1* | 1/2014 | Hunter | H04N 21/44224 |
| | | | 715/719 |
| 2014/0032762 A1 | 1/2014 | Harvey et al. | |
| 2014/0150016 A1 | 5/2014 | Feng et al. | |
| 2014/0278507 A1 | 9/2014 | Potter | |
| 2014/0351030 A1 | 11/2014 | Priebatsch | |
| 2015/0066594 A1 | 3/2015 | Li et al. | |
| 2015/0142514 A1 | 5/2015 | Tutte | |
| 2015/0142592 A1 | 5/2015 | Chauhan | |
| 2015/0142593 A1 | 5/2015 | Chauhan | |
| 2015/0199716 A1 | 7/2015 | Gerard | |
| 2015/0271249 A1 | 9/2015 | Segre et al. | |
| 2015/0271331 A1 | 9/2015 | Segre et al. | |
| 2015/0356610 A1 | 12/2015 | Ponoth | |
| 2015/0379118 A1 | 12/2015 | Wickenkamp et al. | |
| 2015/0381923 A1 | 12/2015 | Wickenkamp et al. | |
| 2016/0094880 A1 | 3/2016 | Ward et al. | |
| 2016/0191970 A1 | 6/2016 | Sheppard et al. | |

(56) References Cited

U.S. PATENT DOCUMENTS

| | | |
|---|---|---|
| 2016/0239857 A1 | 8/2016 | Milton et al. |
| 2016/0247175 A1 | 8/2016 | Milton et al. |
| 2017/0026678 A1 | 1/2017 | Smith et al. |
| 2017/0046683 A1 | 2/2017 | Shaw et al. |
| 2017/0140430 A1 | 5/2017 | Billman et al. |
| 2017/0171581 A1 | 6/2017 | Mulligan et al. |
| 2017/0193546 A1 | 7/2017 | Bennett et al. |
| 2017/0286979 A1 | 10/2017 | Chavez et al. |
| 2017/0330221 A1 | 11/2017 | Bagheri et al. |
| 2018/0077146 A1 | 3/2018 | Lonas |
| 2018/0101611 A1 | 4/2018 | McDevitt et al. |
| 2018/0158093 A1 | 6/2018 | Szirtes et al. |
| 2018/0204256 A1 | 7/2018 | Bifolco et al. |
| 2018/0330249 A1 | 11/2018 | Hajiyev et al. |
| 2019/0174156 A1 | 6/2019 | Crawford et al. |
| 2019/0208242 A1 | 7/2019 | Bates et al. |
| 2019/0364316 A1 | 11/2019 | Harvey et al. |
| 2020/0004884 A1 | 1/2020 | Gibson et al. |
| 2020/0099733 A1 | 3/2020 | Chu et al. |
| 2020/0186879 A1 | 6/2020 | Volinsky et al. |
| 2020/0275153 A1 | 8/2020 | Nicas et al. |
| 2020/0320410 A1 | 10/2020 | Herz et al. |
| 2020/0320548 A1 | 10/2020 | Fusillo et al. |
| 2020/0322682 A1 | 10/2020 | Volinsky et al. |
| 2023/0039090 A1 | 2/2023 | Harvey et al. |

FOREIGN PATENT DOCUMENTS

| | | | | | |
|---|---|---|---|---|---|
| JP | | 3859987 B2 | * | 12/2006 | |
| WO | WO-2008022328 A2 | | * | 2/2008 | ........... G06F 16/437 |
| WO | WO-2008094616 A1 | | * | 8/2008 | ........... G06F 16/437 |
| WO | 2009/068676 A1 | | | 6/2009 | |

OTHER PUBLICATIONS

Admavicius G., et al., "Toward the Next Generation of Recommender Systems: A Survey of the State-of-the-Art and Possible Extensions", IEEE Transaction on Knowledge and Data Engineering, vol. 17, No. 6, Jun. 2005, pp. 734-749.

Li L., et al., "A Contextual-Bandit Approach to Personalized News Article Recommendation", ArXiv: 1003.0146v2, Apr. 26-30, 2010, 10 Pages.

* cited by examiner

510 — RECEIVE DATA INDICATIVE OF CURRENT CONSUMPTION OF A PLURALITY OF CONTENT ASSETS

520 — BASED AT LEAST ON A PORTION OF THE DATA, GENERATE AN INFERENCE ASSOCIATED WITH PROSPECTIVE CONSUMPTION OF A CONTENT ASSET OF THE PLURALITY OF CONTENT ASSETS

530 — MANAGE THE PROSPECTIVE CONSUMPTION OF THE SPECIFIC CONTENT ASSET BASED AT LEAST ON THE INFERENCE

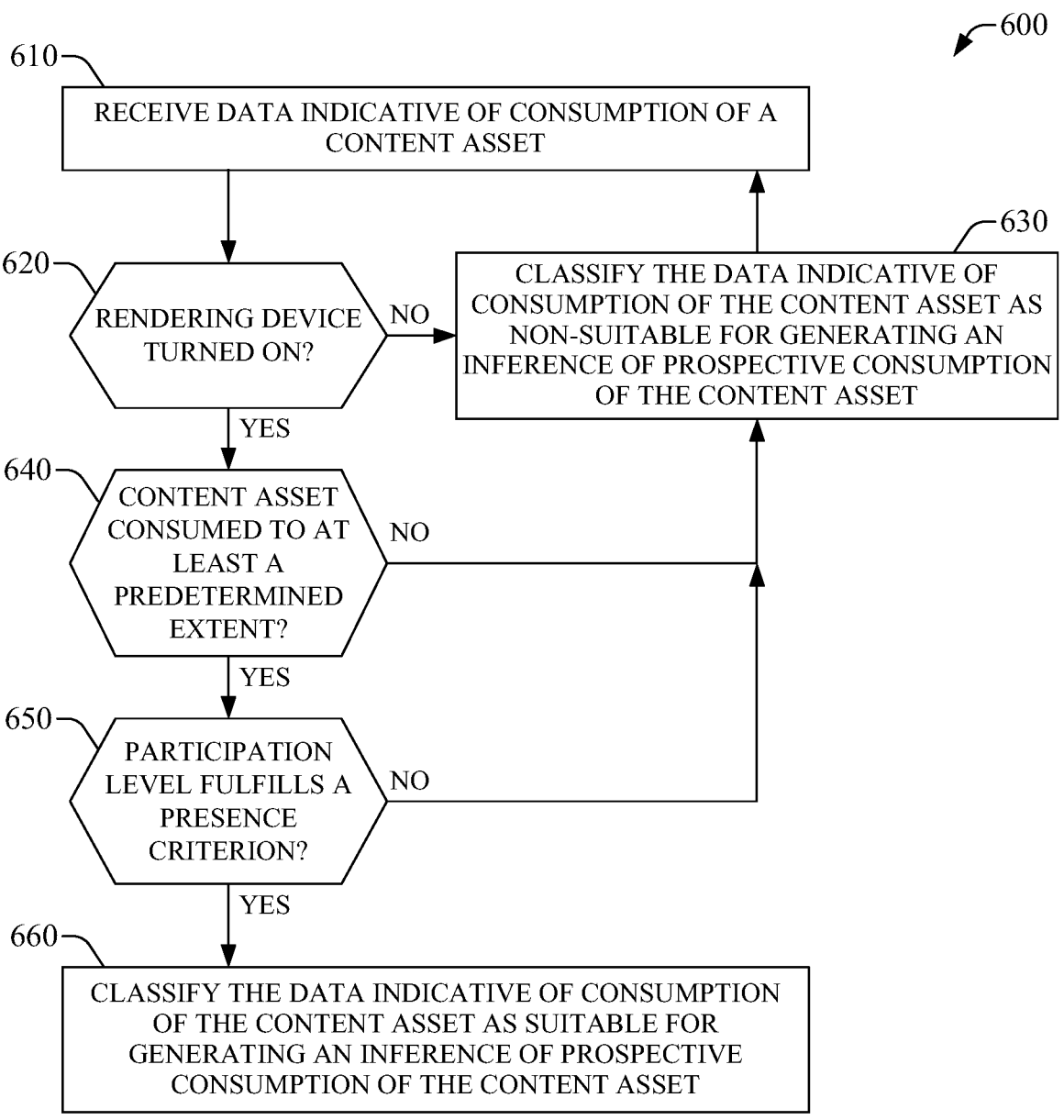

600

610 — RECEIVE DATA INDICATIVE OF CONSUMPTION OF A CONTENT ASSET

620 — RENDERING DEVICE TURNED ON?

NO

630 — CLASSIFY THE DATA INDICATIVE OF CONSUMPTION OF THE CONTENT ASSET AS NON-SUITABLE FOR GENERATING AN INFERENCE OF PROSPECTIVE CONSUMPTION OF THE CONTENT ASSET

YES

640 — CONTENT ASSET CONSUMED TO AT LEAST A PREDETERMINED EXTENT?

NO

YES

650 — PARTICIPATION LEVEL FULFILLS A PRESENCE CRITERION?

NO

YES

660 — CLASSIFY THE DATA INDICATIVE OF CONSUMPTION OF THE CONTENT ASSET AS SUITABLE FOR GENERATING AN INFERENCE OF PROSPECTIVE CONSUMPTION OF THE CONTENT ASSET

FIG. 6

CUSTOMIZED OPTIONS FOR CONSUMPTION OF CONTENT

CROSS REFERENCE TO RELATED PATENT APPLICATION

This application is a continuation of U.S. patent application Ser. No. 17/841,296, filed Jun. 15, 2022, which is a continuation of U.S. patent application Ser. No. 17/137,735, filed Dec. 30, 2020, now U.S. Pat. No. 11,395,024, which is a continuation of U.S. patent application Ser. No. 16/172,392, filed Oct. 26, 2018, now U.S. Pat. No. 10,931,992, which is a continuation of U.S. patent application Ser. No. 13/559,341, filed Jul. 26, 2012, now U.S. Pat. No. 10,158,898, the disclosures of each of which are incorporated by reference herein in their entireties.

BACKGROUND

Generation of suggestions for consumption of content typically is based on heterogeneous segments of consumers. Certain service providers have utilized online methods for generating such suggestions based on, for example, collection of data related to a user's recent consumption of content assets (e.g., two recently viewed movies) and rating thereof according to a fixed scale (such as a scale ranging from one to five). Aggregated or merely cumulative data are then compared against either a database or other users within a specific consumer segment to generate a list of suggestions. In addition or in the alternative, polling of consumers (e.g., a voting solution, such as voting for two content assets of value) generally rely on comparisons against other user's selection of content assets in order to create viewing suggestions. Yet, such customization of content largely fails to incorporate personalized active consumption trends.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

The disclosure relates, in one aspect, to generating personalized options for consumption of content, such as media assets (or content assets) comprising linear-programming assets, non-linear-programming assets, or recorded media assets. Such content can have remote presence (e.g., stored in a network) or local presence (e.g., stored in a device coupled to a network). The personalized options can permit administration of the media assets based at least on consumption behavior of an end-user. For instance, the personalized options can permit automated generation of storage configuration(s) and/or playback configuration(s).

Some embodiments of the disclosure provide various advantages when compared to conventional technologies for routing traffic in an active replication topology. For example, based on machine learning, the disclosure provides one or more personalized options (e.g., viewing options) that can adapt to, at least, frequency of consumption of a media asset. For another example, the disclosure provides options for automated administration of consumption of recorded assets being stored locally and/or remotely in a network repository.

Additional aspects or advantages of the subject disclosure are set forth in part in the description which follows, and in part will be obvious from the description, or may be learned by practice of the subject disclosure. The advantages of the subject disclosure can be realized and attained by means of the elements and combinations particularly pointed out in the appended claims. It is to be understood that both the foregoing general description and the following detailed description are exemplary and explanatory only and are not restrictive of the disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the subject disclosure.

FIGS. 5-7 illustrate exemplary methods in accordance with one or more aspects of the disclosure.

DETAILED DESCRIPTION

Figure 1A:
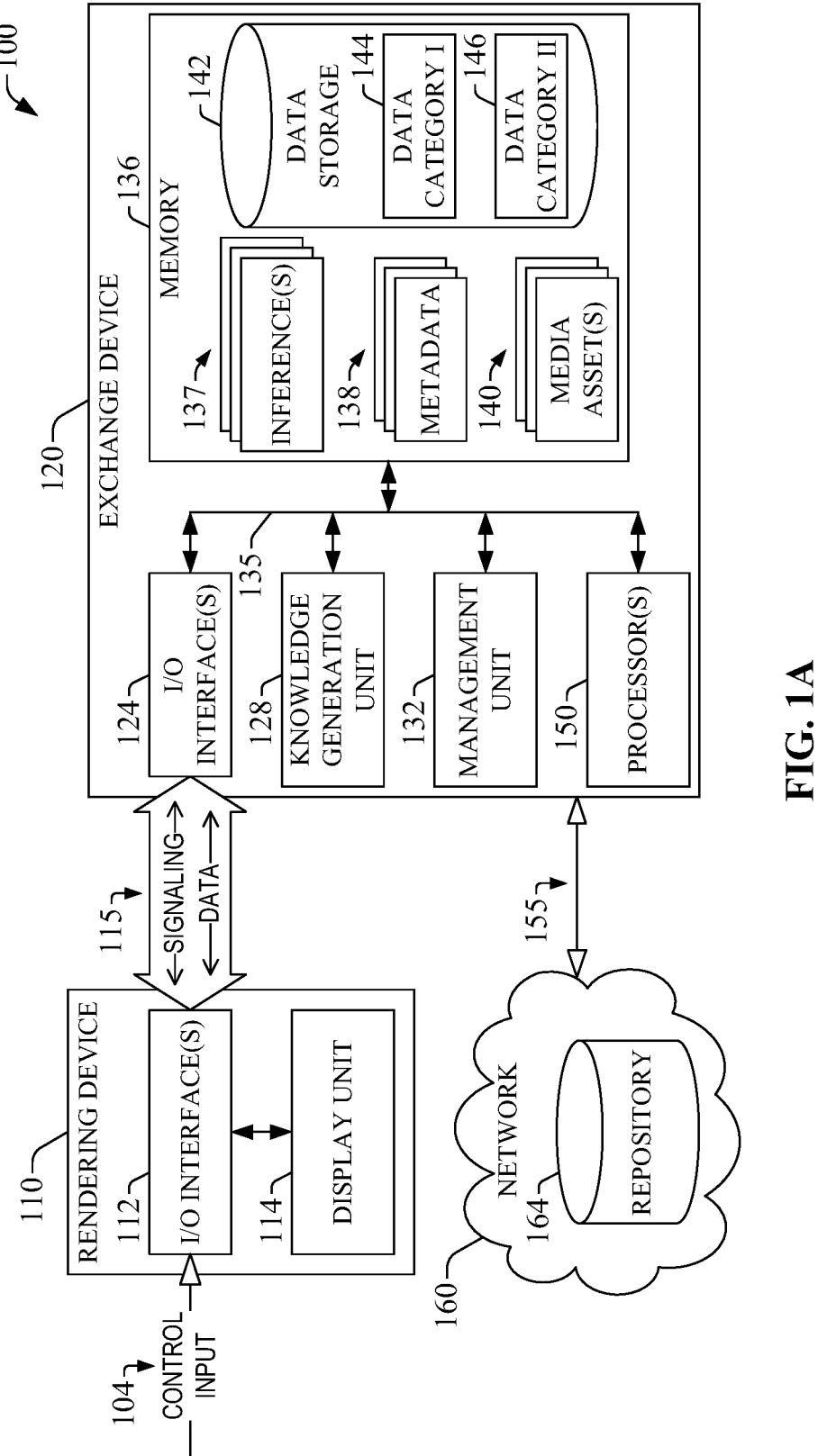
FIGS. 1A-1B illustrate exemplary network environments in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for generating personalized options for consumption of media assets comprising linear-programming assets or recorded media assets having remote presence (e.g., stored in a network) or local presence (e.g., stored in a device coupled to a network). The personalized options can permit administration of the media assets (e.g., automated generation of storage configuration(s) and/or playback configuration(s)) based at least on consumption behavior of an end-user. It is also to be understood that the terminology employed herein is for the purpose of describing particular, non-exclusive embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "layer," "component," "unit," "interface," "platform," "node," "function" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a system, a layer, a node, an interface, a function, a component, a platform, and the like. It is noted that in certain embodiments, or in connection with certain aspects or features such embodiments, the terms "system," "layer," "unit," "component," "interface," "platform" "node," "function" can be utilized interchangeably.

Throughout the description and claims of this specification, the words "comprise," "include," and "having" and their variations, such as "comprising" and "comprises," "include" and "including," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Disclosed are components that can be utilized to perform the disclosed methods, devices, and/or systems. These and other components are disclosed herein, and it is understood that when combinations, subsets, interactions, groups, etc. of these components are disclosed that while specific reference of each various individual and collective combinations and permutation(s) of these may not be explicitly disclosed, each is specifically contemplated and described herein, for all methods, devices, and/or systems. This applies to all aspects of the subject disclosure including steps, or actions, in the disclosed method(s). Thus, if there are a variety of additional steps, or actions, that can be performed, then it is understood that each of such additional steps, or actions, can be performed with any specific embodiment or combination of embodiments of the disclosed methods.

As it will be readily appreciated, in one aspect, the methods, devices, and/or systems of the disclosure can take the form of an entirely hardware embodiment, an entirely software embodiment, or an embodiment combining software and hardware aspects. In an additional or alternative aspect, the methods, devices, and/or systems can take the form of a computer program product on a computer-readable storage medium having computer-readable program instructions (e.g., computer software) embodied in the storage medium. More particularly, the disclosed methods, devices, and/or systems can take the form of web-implemented computer software. Any suitable computer-readable storage medium can be utilized including hard disks, CD-ROMs, optical storage devices, or magnetic storage devices.

Embodiments of the methods and systems are described below with reference to block diagrams and flowchart and/or call-flow illustrations of methods, systems, apparatuses and computer program products. It will be understood that each block of the block diagrams and flowchart illustrations, and combinations of blocks in the block diagrams and flowchart illustrations, respectively, can be implemented by computer program instructions. Such computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions also can be loaded onto a computer or other programmable data processing apparatus to cause a series of operational steps, or acts, to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that can perform the specified functions or steps, or combinations of special purpose hardware and computer instructions.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

The disclosure identifies and addresses, in one aspect, the complexity and difficulty of customizing media programming for the general media-consuming public. As described in greater detail below, in one aspect, the disclosure relates to generating personalized options for consumption of media assets comprising linear-programming assets or recorded media assets having remote presence (e.g., stored in a network) or local presence (e.g., stored in a device coupled to a network). In one aspect, the personalized options can be supplied (e.g., transmitted) asynchronously, based at least on availability of a media asset, and can be indicative of information associated with a media asset of likely interest to an end user. In another aspect, the personalized options can permit administration of the media assets (e.g., automated generation of storage configuration(s) and/or playback configuration(s)) based at least on consumption behavior of an end-user. It should be appreciated that the personalized options described herein can be referred to as "atomic options" in that the options are customized for a single end-user according to historical data directly associated with media consumption behavior for the single user. Certain functional elements of the subject disclosure can be implemented (e.g., performed) by software, hardware, or a combination of software and hardware. Functional elements of the various embodiments described in the present specification and illustrated in the annexed drawings can be employed in operational environments (access network, telecommunication network, signaling network, etc.) that can include, for example, digital equipment, analog equipment, or both, wired or wireless equipment, etc.

Figure 1B:
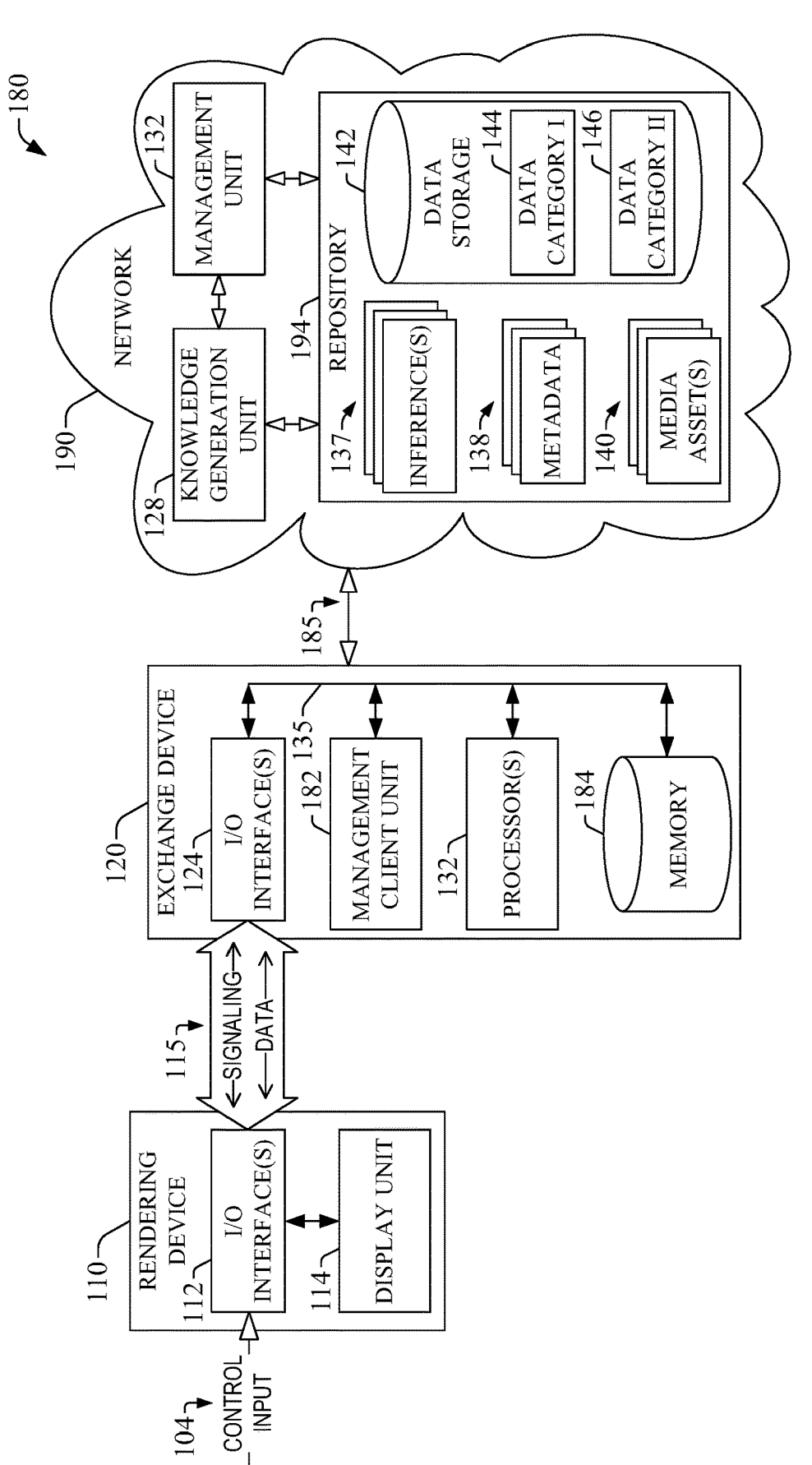

FIGS. 1A-1B are block diagrams of exemplary systems 100 and 180, respectively, that permit customization of consumption of media assets in accordance with one or more aspects of the disclosure. As described herein, certain features of such administration can be automated. The exemplary system 100 comprises a rendering device 110 functionally coupled (e.g., communicatively coupled) to an exchange device 120 (e.g., a set-top box, a personal computer, a mobile computer, a wearable device, or the like) via a data and signaling pipe 115. In one aspect, to enable such coupling, the data and signaling pipe 115 can be functionally coupled to at least one input/output (I/O) interface of the one or more interfaces 112 at the rendering device 110 and to at least one I/O interface of the one or more I/O interfaces 124. The data and signaling pipe 115 can comprise an upstream link, or uplink (UL), and a downstream link, or downlink (DL). The UL flow of information is represented with an arrow oriented outwards from the rendering device 110, whereas the DL flow of information is represented with an arrow oriented towards the exchange device 120. The data and signaling pipe 115 can comprise one or more of: a reference link (Cx, Cr, Dh, Dx, Gm, Ma, Mg, or the like) and related components; conventional bus architectures such as address buses, system buses; wired links, such as high definition multimedia interface (HDMI) cables, fiber optic lines, coaxial lines, hybrid fiber-coaxial links, Ethernet lines, T-carrier lines, twisted-pair line, or the like, and various connectors (e.g., an Ethernet connector, an F connector, an RS-232 connector, or the like); wireless links, including one or more of terrestrial wireless links, satellite-based wireless links, or a combination thereof; and so forth.

As illustrated, the rendering device 110 can comprise a display unit 114 that can receive content (e.g., metadata or data, or both) and/or signaling from an I/O interface of the one or more I/O interfaces 112. Such I/O interface can be or can comprise a HDMI, which can receive control input 104, such as data and/or signaling indicative of an instruction to control the rendering device 110. In one aspect, the instruction can be received from a remote control or other control unit (not depicted) and can be directed to one or more of adjusting volume of audio of a rendered media asset, switching a channel tuned by the exchange device 120, or the like. At least a portion of the content and/or the signaling can be received from the exchange device 120 through the downlink (DL) of the data and signaling pipe 115. The display unit 114 can render at least a portion of the received content. In one embodiment, for example, the display unit 114 can comprise a rendering medium (a liquid crystal layer, a plasma layer, etc.) and backlight system (e.g., a light-emitting-diode lighting system) and related circuitry.

As illustrated, the exchange device 120 can exchange content and signaling (e.g., control messages) with a network 160 via data and signaling pipe 155, the pipe 155 enabling functional coupling that permits such exchange. In one aspect, the exchange device 120 can transmit at least a portion of one or more inference(s) 137 to the repository 164. The network 110 can be, for example, a service network, and such coupling permits, at least in part, the network 110 to provide a service. The content can include media assets (e.g., audio, images, video, or combinations thereof)) and related metadata, the media assets comprising linear-programming assets and recorded media assets. Exchange device 120 can transmit at least a portion of the content exchanged with the network 160 to the rendering device 110 for consumption at the rendering device 110. Similarly to data and signaling pipe 115, the data and signaling pipes 155 can include one or more of wireless links, wire line links, or a combination thereof. In certain implementations, for example, the data and signaling pipe 155 can comprise one or more of: a reference link (Cx, Cr, Dh, Dx, Gm, Ma, Mg, or the like) and related components; conventional bus architectures such as address buses, system buses; wired links, such as fiber optic lines, coaxial lines, hybrid fiber-coaxial links, Ethernet lines, T-carrier lines, twisted-pair line, or the like, and various connectors (e.g., Ethernet connectors, F connectors, RS-232 connectors, or the like); wireless links, including terrestrial wireless links, satellite-based wireless links, or a combination thereof; and so forth.

It should be appreciated that the data and signaling pipe 155 is represented with open-head arrows, to pictorially indicate that one or more network components (router(s), server(s), network switches(s), connector(s), hubs, etc.) can permit communication among the network 160 and the exchange device 120. Communication among the exchange device 120 and the network 160 or a component thereof can be accomplished, at least in part, via data and signaling pipe 155. In one aspect, such communication can be effected in accordance with one or more packet-switched protocols, such as Ethernet protocol format; internet protocol (IP) format, such as IPv4 and IPV6, or the like; TCP/IP; user datagram protocol (UDP) format, HTTP, simple object access protocol (SOAP), simple network management protocol (SNMP), or the like.

In certain embodiments, the network 160 can include wireless networks, wire line networks, or a combination thereof, and can provide a service to one or more devices, such as user equipment, customer premises equipment, control equipment (e.g., signaling units), operation and maintenance (O&M) equipment (e.g., network probes), and the like. In one aspect, the service provided by the network 160 can be a consumer service, such as content communication (media on demand, Internet service, digital telephony (e.g., voice over internet protocol (VOIP)), multimedia message service (MMS), short message service (SMS), etc.); content management (e.g., network digital video recording, messaging administration); emergency services (e.g., enhanced 911); location-based services; or the like. In another aspect, the service provided by the network 160 can be a network administration service, which can comprise one or more of accounting and billing, access control, subscriber provisioning, customer service support (including, for example, interactive voice response (IVR)), performance monitoring (e.g., dashboard services, automation control, etc.), or the like. Architecture of the network 110 can be specific to the provided service.

The network 160 can embody or comprise one or more of a wide area network (WAN), a signaling network (e.g., SS #7), an enterprise network, a local area network, a home area network, a personal area network (which can include wearable devices), or the like. Such networks can operate in accordance with one or more communication protocols for wire line communication or wireless communication. In certain embodiments, the network 160 can have several functional elements that can provide a backbone network, such as a high-capacity packet-switched network. In other embodiments, the network 160 can have internal structure, with several functional elements that can provide at least two main operational blocks: a backbone network (e.g., a high-capacity packet-switched network) and a regional access network (RAN). The internal structure also can include functional elements that provide more spatially localized networks, such as local area networks, home area networks, or the like. Both the backbone network and the regional access network (RAN) can be WANs, for example, with the backbone network having a larger geographical scope than the RAN.

In the exemplary network embodiment 100, the exchange device 120 can comprise a knowledge generation unit 128 that can monitor (collect, receive, collect and analyze, receive and analyze, etc.) data indicative of current or substantially current consumption of one or more plurality of media assets. In certain scenarios, the knowledge generation unit 128 can monitor (e.g., retrieve or receive) data indicative of a linear-programming media asset being rendered. In other scenarios, the knowledge generation unit 128 can monitor (e.g., retrieve or receive) data indicative of playback of a recorded media asset, such as one media asset of the one or more media assets 140.

Based at least on a portion of the data that is monitored (e.g., received), the knowledge generation unit 128 can provide an inference associated with prospective consumption of a specific media asset of the plurality of media assets. In one embodiment, the knowledge generation unit 128 can generate the inference associated with the prospective consumption of the specific media asset. In one aspect, the inference can be generated periodically or at specific times (e.g., according to a predetermined schedule). In another aspect, the inference can be generated in response to specific events, which can be configurable. The events can comprise one or more of a scheduling conflict, unavailable memory resources, or the like. An end-user (or consumer) or a service provider (e.g., owner or lessee of network 110 or portions thereof) can configure such events. One or more of the generated inferences can be retained in memory 136, in a memory element referred to as inference(s) 137.

To generate an inference based on monitored data, in one aspect, the knowledge generation unit 128 can classify the data that is monitored into two or more categories of data. In certain implementations, the two or more categories of data can comprise a first category of data suitable for inferring the prospective consumption of the specific media asset and a second category of data non-suitable for inferring the prospective consumption of the specific media asset. The first category of data is indicative of end-user consumption behavior over a period of time (e.g., a consumption trend) and can comprise the portion of the data utilized for generation of the inference. Such category of data can be referred to as "relevant consumer behavior data."

Accordingly, in one aspect, one or more inputs (e.g., data and/or signaling) can permit categorization of monitored data according to participation level of the end user, such categorization can be included in the classification performed by the knowledge generation unit 128. In one scenario in which the data and signaling pipe 115 is embodied in a HDMI cable, such cable and a remote control that can supply control input 104 can be examples of at least two of a plurality of inputs that can permit the determination of relevancy of collected data related to consumption of a media asset. In one aspect, determining value of data associated with a consumed media asset can include ascertaining that the media asset is being actively consumed (e.g., actively viewed) or passively consumed. For an end-user that can consume a media asset (e.g., watching a television show), there can be various inputs (e.g., control input 104)—regardless of how straightforward they might be—that can provide elements for determining an active participation level associated with the end-user. In such scenario, the end-user (who may be a customer) may have disable the rendering device 110 or, in the alternative, the end-user may not be actively consuming (e.g., viewing) the media-asset, such as in a situation in which rendering of the media asset is initiated, but the consumer is no longer in proximity of the rendering device 110 at a later time and thus the end-user no longer actively consumes the media asset.

Inputs from a physical interface and/or link (e.g., an HDMI cable) and/or inputs from a wireless interface (e.g., the air interface) and/or link (e.g., a radiofrequency (RF) link), such as a signal received from an actuated remote control, can provide information to the exchange device 120—via signaling transmitted through link(s) 115, for example—as to whether the rendering device 110 is operating actively and/or whether the end-user is causing at least a portion of such inputs in order to interact with or to control a rendering of the media asset. Such interaction or control can comprise a change in a state of the rendering of the media asset, for example, by pausing or fast forwarding rendered content, by actuating (physically or remotely) volume controls (mute, volume up, volume down, etc.), or by switching a channel delivering the media asset, in case of linear programming. In addition or in the alternative, at least the portion of the inputs can permit determining a degree of consumption of the media asset. For instance, it can be ascertained that the media asset is fully consumed, mostly consumed, partially consumed, or marginally consumed.

Upon or after a participation level is determined, in one aspect, frequency of consumption of the media asset can be determined, particularly for recorded media assets. In one aspect, the management unit 132 can perform such determination. In one scenario in which a media asset is viewed several times and/or not intentionally or otherwise deleted after consumption, it can be gleaned (via the knowledge generation unit 128, for example) that the media asset is desirable for consumption, and therefore repeat consumption also can be desirable.

Knowledge generation unit 128 can retain the data in the first category and the data in the second category in respective memory elements (registers, memory pages, files, databases, etc.) in data storage 142. In one aspect, a first memory element, represented with a block labeled data category I 144, can contain data in the first category, a second memory element, represented with block labeled to as data category II 146, can contain data in the second category. In one or more embodiments, the knowledge generation unit 128 can implement artificial intelligence (AI) techniques, such as machine learning and iterative learning, to generate an inference. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning).

It should be appreciated that classification of the data that is monitored into such categories can permit separation of data into data containing behavioral information of a consumer (e.g., an end-user) of a media asset and data representing operation of the rendering device 110 that is not associated with such behavioral information. The second category of data can originate from rendering content that is not responsive to behavior of an end-user that can consume the content via the rendering device 110. For instance, in one scenario, the rendering device 110 can render content, such as a linear-programming asset, without an end-user consuming such content—e.g., actively watching the content or interacting with the rendering device 110 during delivery of the content—thus information indicative of the linear-programming asset (e.g., "PBS" in Channel 2) being rendered for a period of, for example, 4-10 hours may not suitable for generating an inference of consumption of such asset. To classify data into the second category of data, in one embodiment, knowledge generation unit 128 can determine that at least the I/O interface of I/O interface(s) 112 that receives content at rendering device 110 interface is switched off for a specific period, and during the specific period, the knowledge generation unit 128 can assign at least a portion of the data monitored (e.g., received) during the specific period to the second category of data.

In one embodiment, the knowledge generation unit 128 can update an extant classification of data as a function of time based on a relevancy score Σ (e.g., a real number) determined at least in part by one or more of specific media asset, source of the media asset (e.g., recorded asset or linear-programming asset), cumulative of a time interval of consumption of the media asset, and longevity of the data. In one implementation, the relevancy score Σ can be defined as, for example:

$$\sum = \frac{t_v + f(a_{DVR}) + g(a_{VOD})}{\sqrt{\Delta t_v}}. \qquad \text{Eq. (1)}$$

Here, $t_v$ represents the time period (e.g., hours) that the media asset has been consumed; $\Delta t_v$ represents a time period since the media asset was consumed (e.g., number of days since the media asset was last viewed); f(·) and g(·) each represent functions (e.g., real-valued linear functions) that can be reconfigurable and can provide a weight to Σ in response to the media asset being a recorded media asset retained via a digital video recording (DVR) functionality of the exchange device 120, or a video-on-demand (VOD) media asset, the value of the parameter $\alpha_{DVR}$ being 0 if the media asset is not a recorded media asset (such as a linear-programming asset), 1 if the media asset is recorded via DVR and not viewed, and 2 if the media asset is recorded via DVR and viewed; and the value of the parameter $\alpha_{VOD}$ being 0 if the media asset is not a VOD non-linear asset or 1 is the media asset is a VOD non-linear asset.

In one aspect, such time-dependent update can be referred to as data aging and can permit maintaining a categorization of data that more closely conveys substantially current consumer behavior over longer term historical data. In one aspect, the denominator in Eq. (1) is an age scaling function (also referred to as aging function). While substantially any aging function can be utilized, the square root function is typically utilized as aging function because the first derivative of the square root function has values that are large for small arguments (e.g., smaller than unity and greater than zero) with the second derivative having small values for arguments greater than about unity. Such behavior provides an aging function that has a steep initial increase that "levels out" for moderate values of the argument of such function. Thus, "age penalty" of relevancy is prevented from dominating the behavior of the relevancy score Σ while incorporating aging scaling that increases over time, which reduces the value of Σ for larger times.

It should be appreciated that certain aging functions, such as linear functions or polynomial functions, can yield small aging effects as time elapses from a present time. As an illustration, utilizing the square root function as the aging function and adopting the hour as the unit of time, after one hour has elapsed, the denominator would be 1 and after 2 hours, the denominator would be approximately 1.414, which represents a increase of nearly 40%. Yet, after three weeks and four weeks, for example, the denominator in Eq. (1) would be approximately 22.45 and 25.92, respectively, yielding a relative increase in the aging function of about 15% despite the large time change (e.g., 1 week=168 hs). Such behavior of the square root function renders it a desirable aging function.

Other functions provide similar aging behavior, particularly, yet not exclusively, a real-valued function h(·) having a decreasing slope for increasing times can be a suitable alternative to the square root function. For example, log(·) is one such function. Yet, since log(·) adopts negative values between 0 and 1, the argument is generally shifted by the unity, e.g., $\log(\Delta t_v+1)$ can be utilized. For another example, the cube root or any higher root of an argument value also can be suitable as an aging function.

It should be appreciated that, in view of at least in part of the classification of data described herein, the knowledge generation unit 128 generates inferences based on data indicative of consumer behavior. Accordingly, the exchange device 120 effectively can learn specific consumption preferences of an end-user that consumes content via the rendering device 110.

Exchange device 120 can administer consumption of one or more media assets based on one or more of the inferences associated with prospective consumption of a media asset. In one aspect, management unit 132 can manage a configuration of the prospective consumption of the media asset based at least on one such inference (e.g., a specific one of the one or more inferences 137).

In certain scenarios, management of such configuration can be contingent at least on receiving information (e.g., input data) from an end-user that can consume the media asset. For example, when the media asset is a motion picture, such as video segment, a video streaming session, a linear-programming asset, or the like, a configuration of the prospective consumption of the motion picture can be referred to as a viewing option. To manage the configuration of prospective consumption of a media asset in such scenarios, the management unit 132 can provide (e.g., generate, transmit, generate and transmit, etc.) a notification that the linear-programming asset (e.g., "Star Wars" in Spike TV) is available for consumption at a specific time. In one aspect, the notification can be conveyed to the rendering device 110 as part of data transmitted via the data and signaling pipe 115. In response, the rendering device 110, via the display device 114, for example, can render indicia (e.g., visual, aural, a combination thereof) conveying that the linear-programming asset is available for consumption. For instance, the display unit can render a pop-up window displaying a message identifying such asset. In another additional or alternative aspect, the management unit 132 can prompt such end-user, as part of the notification, to consume the linear-programming asset. In one scenario, for example, the foregoing indicia can prompt the user to switch to a channel transmitting the linear-programming asset—e.g., the pop-up window can convey the message "Would you like to tune to Star Wars on Spike TV?"

In other scenarios, management of the configuration of prospective consumption of a media asset can comprise administration of configuration(s) of one or more recorded media assets. Such assets can be recorded in local storage, e.g., retained in memory 136 of the exchange device 120, or in cloud storage, such as a network repository 164 that contained in network 160. In one aspect, management unit 132 can assign a playback priority to a recorded media asset based at least on an inference of likelihood of playback of the recorded media asset. Such inference can be generated by the knowledge generation unit 128 and can be contained in the one or more inferences 137. In one implementation, to assign such priority, the management unit 132 can provide a notification of the playback priority. In such implementation or in an alternative implementation, to assign the playback priority to the recorded media asset, the management unit 132 can configure the playback priority in the exchange device 120 or most any other device that can retain the recorded media asset and is functionally coupled to the exchange device 120.

Configuration of the playback priority can include generation of a record, e.g., a specific instance of metadata 138, in memory 136, the record being associated with the recorded media asset. It should be appreciated that certain metadata of the metadata 138 can tag (or flag) one or more recorded media assets with, for example, specific information associated with instances of consumption of a media asset—e.g., metadata can be or can comprise <usage="viewed multiple times"> and/or <usage-number_of_times_viewed>. Additional or alternative metadata of metadata 138 can comprise information associated with the extent of consumption of the media asset, e.g., media asset viewed to completion, consumed portion (e.g., a specific percentage) of the media asset, and/or fast-forward portion of the media asset. As another alternative or additional instance, the metadata of metadata 138 can comprise information associated with consumption recency, e.g., time elapsed from initiation recordation of (or otherwise access to) the media asset and first consumption. As a further alternative or instance, the metadata of metadata 138 can comprise information associated with state of the media asset at the time of consumption, the state indicating, for example, the media asset is a recorded asset (e.g., a VOD asset, an nVOD asset, or a locally recorded asset) or the media asset is a linear-programming asset.

In another aspect, the management unit 132 can assign a deletion priority to the recorded media asset based at least on the inference of likelihood of playback of the recorded media asset. In one implementation, to assign such priority, the management unit 132 can provide a notification of the deletion priority and, in response, implement (e.g., configure) the notification via metadata, for example. Such notification, in one aspect, can be embodied in data transmitted to the rendering device 110 and rendered, via the display unit 114, for example. In such implementation or in an alternative implementation, to assign the playback priority to the recorded media asset, the management unit 132 can configure the deletion priority in the exchange device 120 or most any other device that can retain the recorded media asset and is functionally coupled to the exchange device 120. As an example, if an end-user has watched a recorded media asset (e.g., one of media asset(s) 138) at least 3 times, knowledge generation can generate an inference based on such consumption frequency information indicative of an adjustment to a deletion priority of the recorded media asset. In one scenario, the exchange device 120 can transmit a notification to the rendering device 110 which, in response, can render indicia (e.g., a pop-up window) conveying a configuration menu suggesting that such deletion priority be changed from, for example, "delete when no memory space is available" to "delete upon end-user request."

In still another additional or alternative aspect, the management unit 132 can assign a scheduling, or queuing, priority for recordation of a linear-programming asset for example. In one scenario, for example, an end-user can have access (e.g., a subscription) to at least an entire season (e.g., a predetermined group of episodes) of a first linear-programming asset (such as "The Office") and similar access to a second linear-programming asset (e.g., "Hoarders"). In an initial configuration of the exchange device 120, the second linear-programming asset can have scheduling priority over the second linear-programming asset. Yet, as the end-user consumes content via the rendering device 110 over certain period (e.g., a few weeks), data collected at the exchange device 120 can be indicative that the end-user has not reproduced a single recorded episode of the second linear-programming asset (e.g., "Hoarders"). Yet, in such period, the data is indicative of the end-user having reproduced at least one episode of the first linear-programming asset (e.g., "The Office") one or more times. Accordingly, based at least on such data, the knowledge generation unit 128 can generate an inference that permits the management unit 132 to assign or to supply a recommendation to an end-user to assign a higher scheduling priority to the first linear-programming asset.

The exemplary system 180 depicted in FIG. 1B can permit customization of consumption of a media asset in a distributed environment (e.g., a client-server environment). Such environment can be suitable for a exchange device 120 with computational resources that may prevent it from processing data and generating one or more inferences as described herein. For example, in one scenario, the exchange device 120 can be a legacy set-top box with limited computational resources. Yet, by operating as a client of a network 190, such set-top box can implement at least certain features described herein.

In one implementation, the exchange device 120 can collect data and/or signaling from the rendering device 110 via the data and signaling pipe 115, as described herein, and can transmit at least a portion of such information to a repository 194 contained in a network 190. In one aspect, at least the portion of the information can be transmitted to a data service that can be implemented by an application layer (not depicted) at the network 190. In another aspect, a network-based service can be associated with the data service and to the repository 194. The network-based service can comprise, for example, a cloud-based service or a web-based service that provides a user interface for an exchange device (e.g., a set-top box embodying exchange device 120) having networking functionality. In certain embodiments, such network-based service can be implemented by at least one server in an application layer (not depicted) and can enable the functionality of the knowledge generation unit 128 and the management unit 132 in accordance with aspects described herein. In certain implementations, the network 190 can be substantially the same as the network 160, with the specific feature of containing the knowledge generation unit 128, the management unit 132, and the repository 194. In one embodiment, the knowledge generation unit 128 and the management unit 132 can be part of an application layer (not depicted) in the network 190, whereas the repository 194 can be part of a data layer (not depicted).

The data service can utilize the repository 194. In one aspect, the exchange device 120 can transmit at least a portion of data and/or signaling securely. To at least such end, in one implementation, the exchange device 120 can have a management client unit 182 that can generate a hash of identifying information of the exchange device 120 (e.g., personal information of an owner or lessee of such device) and can utilize the hash to securely transmit at least the portion of the data and/or information to the repository 194. It should be appreciated that generating such hash in order to convey information at the repository 194, which can be associated with the data service, such identifying information can be maintained secure while retaining collected data and/or signaling at the data storage 142 at the repository 194. In certain implementations, the management client unit 120 can transmit, to the data storage 142, information comprising data indicative of consumed media assets, time of consumption, time of deliver of a linear-programming asset, and so forth.

The knowledge generation unit 128 and the management unit 132 can operate in accordance with one or more features described herein. In one aspect, the knowledge generation unit 128 and the management unit 132 can transmit various types of information (e.g., data or metadata, or combinations thereof) to the repository 194. The exchange device 120, via the management client unit 182, for example, can utilize a hash function to access the repository 194 or a functional element thereof in order to retrieve data indicative of an inference (e.g., a personalized option or suggestion). In certain implementations, the exchange device 120 can execute the hash-function (periodically, for example) to produce hashed account information associated with consumption of media asset at the rendering device 110, for example. Upon or after generation of the hashed account information, the exchange device 120, via the management client unit 182, for example, can utilize the hashed account information to access (e.g., retrieve) consumption information at the repository 194, the consumption information permitting determination or access to one or more inferences in accordance with aspects described herein. The consumption information can comprise consumption statistics and related metadata from an account associated with the hashed account information, such statistics and related metadata comprising one or more of information associated with recently viewed linear programming; extent of consumption of at least one (e.g., one, two, more than two, each) recorded media asset that is viewed; number of times a media asset has been consumed; and source of media asset, such as linear programming or non-linear source (e.g., VOD server or nVOD).

Figure 2:
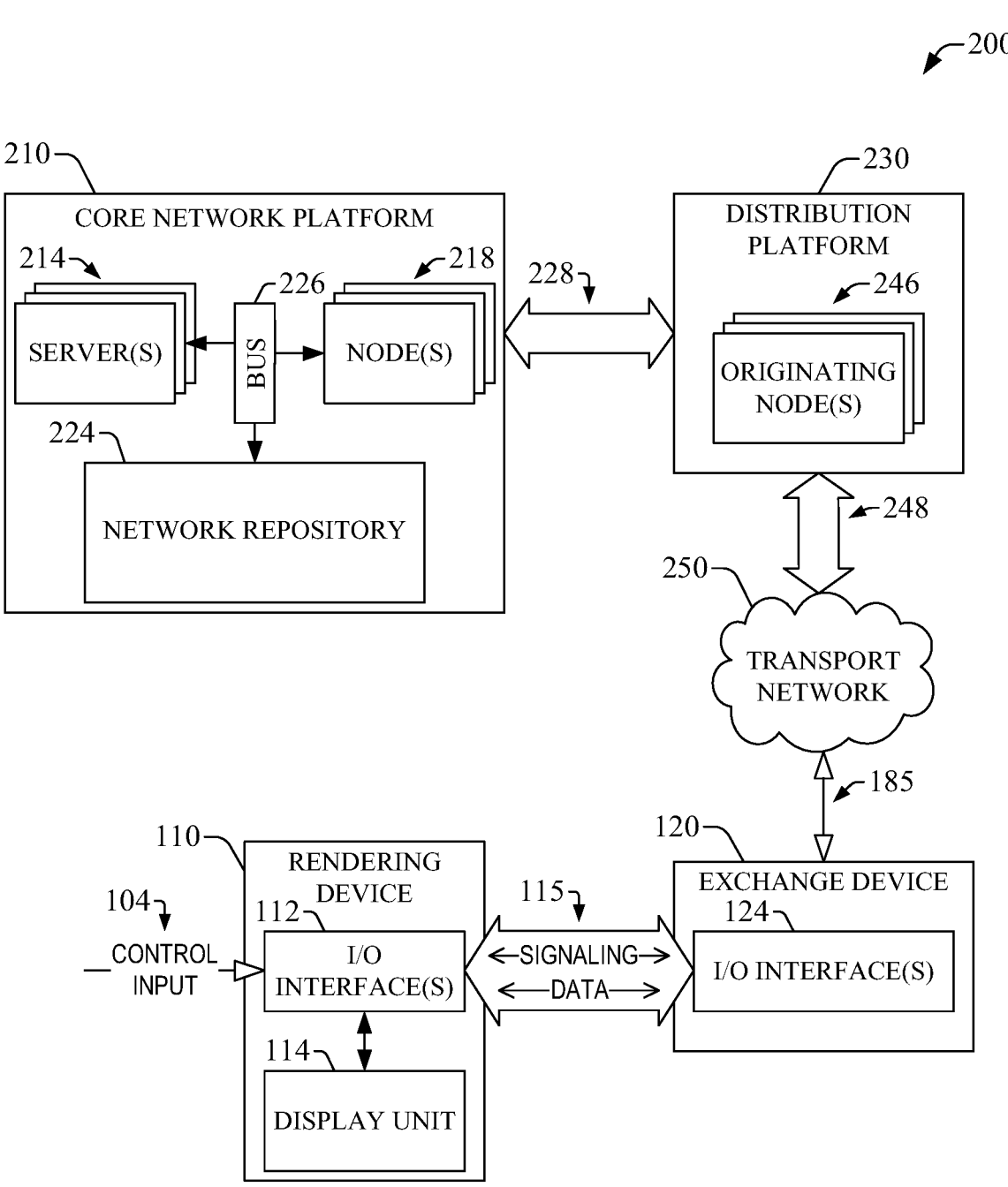
FIG. 2 illustrates an exemplary network in accordance with one or more aspects of the subject disclosure.

FIG. 2 is a high-level block diagram of an exemplary network 200 in accordance with one or more aspects of the disclosure. As illustrated, the network 200 comprises a core network platform 210 functionally coupled to a distribution platform 230 via a data and signaling pipe 228. The distribution platform 230 is functionally coupled to a transport network 250 via a data and signaling pipe 248. Each of the data and signaling pipes 228 and 248 can comprise at least some of the structural and functional features of other data and signaling pipes described herein. The network is functionally coupled to the exchange device 120 via the data and signaling pipe 185. While the exchange device 120 is illustrated as comprising the I/O interface(s) 124, it should be appreciated that such device also can include other functional elements in accordance with the exemplary embodiments shown at FIGS. 1A and 1B and aspects described herein. In one embodiment, the core network platform 210, the distribution platform 230, the transport network 250 and the data and signaling pipes 228 and 248 can embody or can comprise the network 160. In such embodiment, the network repository 224 can embody or can comprise the network repository 164, and the exchange device 120 can comprise the illustrated I/O interface(s) 124 and the knowledge generation unit 128, the management unit 132, the processor(s) 150, and the memory 136 having the memory elements shown in FIG. 1A.

In another embodiment, the core network platform 210, the distribution platform 230, the transport network 250 and the data and signaling pipes 228 and 248 can embody or can comprise the network 190. In such embodiment, at least one server of the server(s) 214 can embody or can comprise the knowledge generation unit 128 and the management unit 132; and the network repository 224 can embody or can comprise the repository 194 and the memory elements shown in FIG. 1B. In addition, in such embodiment, the bus 226 can embody or can comprise the functional elements (represented with open-head arrows in FIG. 1B) that permit functional coupling between two or more of the knowledge generation unit 128, the management unit 132, and the repository 194.

The core network platform 210 can have a packet-switched (PS) architecture. The core network platform 210 can include various network nodes which can be distinguished according to the functionality thereof. As illustrated, the various network nodes can comprise one or more server(s) 214, one or more node(s) 218 (e.g., gateway node(s)), and a network repository 224. While illustrated as a single entity, the network repository 224 can be distributed in order to provide data resiliency and other data management advantages. In addition, while core network platform 210 is illustrated as a single block, in one or more embodiment(s), such platform can be distributed, having a centralized deployment site and a plurality of distributed deployment sites. Functionality and architecture of the one or more server(s) 214, the one or more node(s) 218, and the network repository 224 can be specific, yet not exclusive, to the particular embodiment of the core network 210. As an example, in an exemplary embodiment in which the core network platform 210 is an internet protocol multimedia subsystem (IMS) network, network repository 224 can be a home subscriber server (HSS); server(s) 214 can comprise application server(s), and specific function control nodes (e.g., Call Session Control Functions (CSCFs), such as serving CSCF (S-CSCF) and interrogating CSCF (I-CSCF)) and proxy servers; and node(s) 218 can comprise a breakout gateway control function (BGCF), a media gateway (MGW) and a signaling gateway (SGW), and media gateway control function (MGCF).

Network nodes, or network elements, in the core network platform 210 can be functionally coupled through a bus 226, which can permit exchange of information (e.g., data, metadata, signaling, or any combination thereof) among the server(s) 214, the node(s) 218, and the network repository 224. Bus 226 can include a plurality of reference links (Cx, Cr, Dh, Dx, Gm, Ma, Mg, etc.) and associated components, and conventional bus architectures such as address buses, system buses, power buses, and the like.

Distribution platform 230 can comprise one or more signal processing component(s) (not depicted) that can receive and operate on an information stream, such as a data stream, a signaling stream, or a combination thereof. In one aspect, such component(s) can perform one or more operations on the information stream, such encoding, modulation, encryption, multiplexing, up-conversion, down-conversion, combination, and the like. Architecture of the distribution platform 230 can be specific to the implemented modality exploited for transmission of the information stream. Such modality can include wired delivery or wireless delivery, and specific protocols for transmission of information such as packet-switched communication, circuit-switched communication, or the like. In one embodiment, at least one of such signal processing component(s) can embody a termination system (TS), such as, in one type of network, a cable modem termination system (CMTS). In another embodiment, at least one of the one or more signal processing components of distribution platform 230 can embody a network router or a network switch (e.g., a digital subscriber line access multiplexer (DSLAM)) for transmission of information streams based on a PS communication protocol, such as internet protocol (IP) (e.g., IPv4 or IPv6). As illustrated, the distribution platform 230 can comprise a group of one or more originating nodes 246 that can transmit an information stream or a processed instance thereof.

In certain embodiments, each originating node of the group of one or more originating nodes 246 can embody or can comprise an edge quadrature amplitude modulation (QAM) node. In other embodiments, each originating node of the group of one or more originating nodes 246 can embody or can comprise a device that consolidates the functionality of a termination system (e.g., a CMTS) and an edge QAM node. In yet other embodiments, each originating node of the group of one or more originating nodes 246 can embody or can comprise a network router (e.g., a broadband remote access server (BRAS)) or network switch (e.g., a DSLAM) for transmission of information streams based on a PS communication protocol (e.g., internet protocol). In other embodiments, the network 200 can be implemented, end-to-end or a portion thereof, as an IP or packet-switched system.

While illustrated as a single block, in one or more embodiment(s), the distribution platform 230 can be distributed, having a centralized deployment site (or plant) and a plurality of hub sites (also referred to as sites). In such embodiment(s), each one of the hub sites can comprise an edge originating node of the group of one or more edge originating nodes 246.

The distribution platform 230 can receive data (data flows, audio signals, video signals, any combinations thereof, etc.), metadata, and/or signaling (control instructions, clock signals, etc.) from a functional element that is, for example, part of core network platform 210 or that is functionally coupled thereto. In one scenario, the functional element can be a server that supplies a combination of audio signal and video signal, such as an audiovisual signal comprising a video asset. The server can be, for example, a content server for pay-per-view programming or video-on-demand assets, an application server, a data server, a telephony server, a backbone network router, or the like. In such scenario, based on the formatting of the audiovisual signal, one or more signal processing components (not shown) in the distribution platform 230 can process (encode, encrypt, modulate, multiplex, up-convert, down-convert, combine, etc.) the audiovisual signal and supply a resulting audiovisual signal to an edge originating node of the group of one or more originating nodes 246. An originating node can transmit a plurality of P (a natural number) data streams, conveying at least a portion of the audiovisual signal. It should be appreciated that in certain embodiments, the edge originating node can operate on the audiovisual signal without reliance on such one or more signal processing components. In another scenario, a source node (e.g., a satellite transceiver coupled to an asset source) coupled to the distribution platform 230 can generate an audiovisual signal, which can be processed by one or more processing component(s) and supplied to an edge originating node of the one or more originating nodes 246. Such edge originating node can transmit a plurality of Q (a natural number) data streams conveying at least a portion of the audiovisual signal.

A node of the one or more nodes 218 (e.g., gateway node(s)) can receive information from a server of the one or more servers 214 and relay it, for example, to a session resource manager (SRM) server (not depicted) that can be included is part of the distribution platform 230. In another implementation, a server (such as a proxy server) of the one or more servers 214 can receive information and relay it to the SRM server.

As illustrated, the network 200 comprises a transport network 250 which can be a wide area network (WAN) that can be embodied in a wireless network, a wireline network, or a combination thereof, and supplies data service(s) (e.g., television programming, video on demand, Internet service, packet-switched data or telephony) to a user location comprising the exchange device 120. In certain implementations, transport network 250 can be embodied in an optic fiber network, a coaxial cable network, a hybrid fiber coaxial (HFC) network, or a wireless network comprising terrestrial wireless links and deep-space links (e.g., satellite links), or any combination thereof. As an illustration, in an embodiment in which the transport network 250 is an HFC network, the data pipe and signaling 248 can comprise several optic fiber links and associated optical functional elements, such as downstream lasers, light amplifiers, last-mile fiber aggregator node, and the like. In addition, in such embodiment, the transport network 250 can comprise various RF amplifiers and coaxial taps to respective dwellings (e.g., a stationary user location) wherein the exchange device 120 can be located and can consume a data service (VOD, nVOD, etc.) provided through the distribution platform 230. In such embodiment, the exchange device 120 can be functionally coupled to a cable modem or other device that serves as the network gateway to the dwelling network (not depicted) from the transport network 250. As another illustration, in an embodiment in which the transport network 250 is a wired broadband PS network, the data pipe and signaling 248 can comprise Ethernet links, and can include network routers such as BRASs and network switches, such as DSLAMs. The network switches can be functionally coupled to home gateways (e.g., DSL modems) in dwellings in which the exchange device 120 can consume data services provided through the distribution platform 230.

Figure 3:
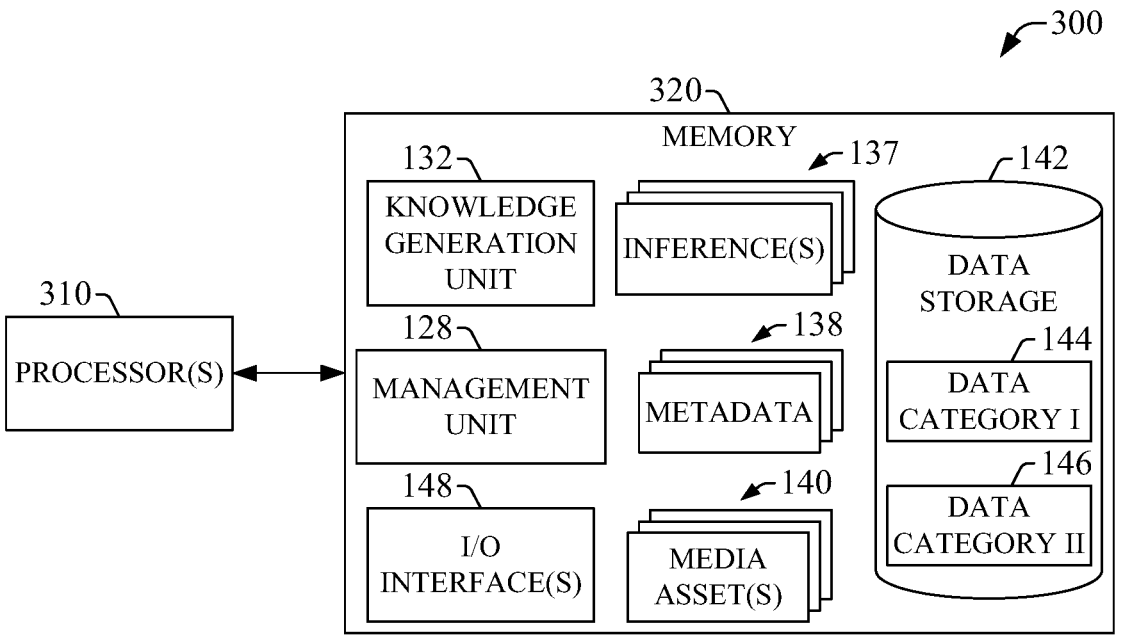
FIGS. 3-4 illustrate exemplary embodiments of computing devices in accordance with one or more aspects described herein.

FIG. 3 is a block diagram of an exemplary embodiment 300 of the exchange device 120 for generation of recommendations and/or for administration of consumption of media assets in accordance with one or more aspects of the disclosure. As described herein, certain features of such administration can be automated. As described herein, the exchange device 120 comprises a memory 320 that can have computer-executable instructions that can embody or can comprise knowledge generation unit 132 and management unit 128. In addition, in the illustrated embodiment, the exchange device 120 can comprise one or more I/O interfaces 148 that can embody one or more application processing interfaces (APIs).

In one aspect, the exchange device 120 can comprise the processor(s) 310 which can be functionally coupled to the memory 320 and can be configured, by the computer-executable instructions, to receive data indicative of consumption of a plurality of media assets. In one aspect, the processor(s) 310 can embody or can comprise the processor(s) 150. In certain implementations, the consumption can be current consumption of at least a first one of the plurality of media assets. In other implementations, the consumption can be historical consumption of at least a second one of the plurality of media assets. Based at least on a portion of such data, in one aspect, the processor can be configured by the computer-executable instructions to provide an inference associated with prospective consumption of a specific media asset of the plurality of media assets. In another aspect, as described herein, the processor can be configured by the computer-executable instructions to manage a configuration of the prospective consumption of the specific media asset (e.g., a recorded asset) based at least on the inference. Such configuration can embody or can comprise an instance of administration of consumption of the specific media asset.

In one scenario, to manage the configuration, the processor(s) 310 can be configured, by the computer-executable instructions, to assign a playback priority to a recorded media asset (e.g., one of the one or more media assets 140) based at least on an inference of likelihood of playback of the recorded media asset. The playback priority of the recorded media asset can be embodied in metadata (e.g., retained in one of the metadata 138) representative of placement of such asset in an ordered list of media assets to be reproduced and/or rendered in the rendering device 110. In another scenario, to manage the configuration, the processor(s) 310 can be further configured, by the computer-executable instructions, to assign a deletion priority to a recorded media asset based at least on an inference of likelihood of playback of the recorded media asset. Similarly to the playback priority, the deletion priority of the recorded media asset can be embodied in metadata (e.g., retained in one of the metadata 138) representative of placement of such asset in an ordered list of media assets to be removed from the memory 320.

As described herein, to provide the inference, the processor(s) 310 can be further configured to generate the inference in accordance with one or more aspects described herein. For instance, in one implementation, the processor(s) 310 can execute the computer-executable instructions that embody the knowledge generation unit 132. In one aspect, to provide the inference, the processor can be configured, by the computer-executable instructions, to classify the data into at least two categories of data comprising: a first category of data suitable for inferring the prospective consumption of the specific media asset; and a second category of data unsuitable for inferring the prospective consumption of the specific media asset.

In certain implementations, to provide the inference, the processor can be further configured to receive the inference. In such implementations, for example, the processor(s) 210 can receive the inference from a component external to the exchange device 120.

Figure 4:
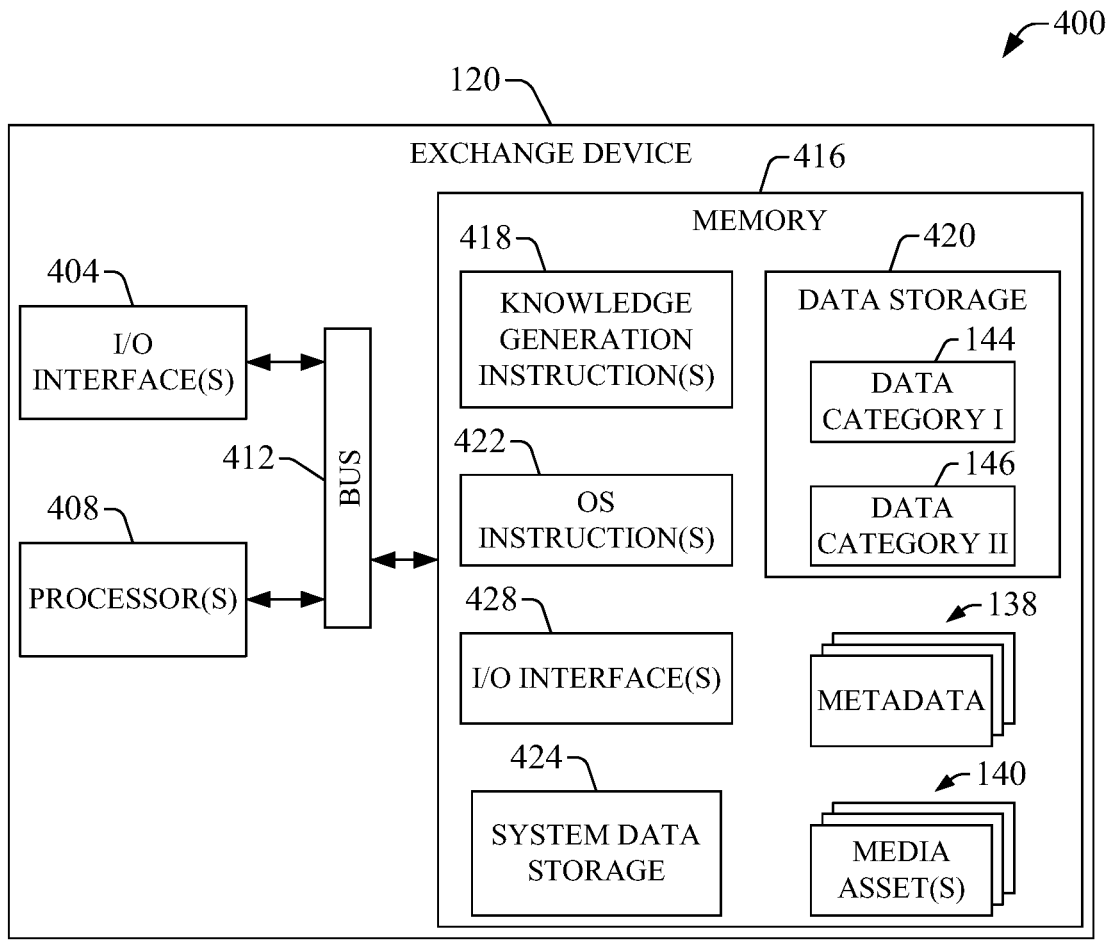

FIG. 4 is a block diagram of an exemplary embodiment 400 of the exchange device 120 in accordance with one or more aspects of the disclosure. In the illustrated embodiment, the exchange device 120 comprises a group of one or more I/O interfaces 404, a group of one or more processors 408, a memory 416, and a bus 412 that functionally couples (e.g., communicatively couples) two or more of the functional elements of the exchange device 120 including the group of one or more processors 408 to the memory 416. In certain scenarios, the group of one or more processors 408 can comprise a plurality of processors that can exploit concurrent computing.

Functionality of the exchange device 120 can be configured by a group of computer-executable instructions (e.g., programming code instructions or programming modules) that can be executed by at least one processor of the one or more processors 408. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the at least one processor. For example, a first group of computer-executable instructions can configure logic that, in response to execution by the at least one processor, can enable the exchange device 120 to operate as a computing device (e.g., a server), a gateway node, or the like.

Data and computer-accessible instructions, e.g., computer-readable instructions and computer-executable instructions, associated with specific functionality of the network node 502 can be retained in memory 416. Such data and instructions can permit implementation, at least in part, of the latency-based routing, and related load balancing, of queries in accordance with one or more aspects of the disclosure. In one aspect, the computer-accessible instructions can embody any number of programming code instructions or program modules that permit specific functionality. In the subject specification and annexed drawings, memory elements are illustrated as discrete blocks, however, such memory elements and related computer-accessible instructions (e.g., computer-readable and computer-executable instructions), and data can reside at various times in different storage elements (registers, memory pages, files, databases, memory addresses, etc.; not shown) in memory 416.

Data storage 420 can comprise a variety of data, metadata, or both, associated with latency-based routing, and relating load balancing, in accordance with aspects described herein.

Memory 416 also can comprise one or more computer-executable instruction(s) for implementation of specific functionality of the exchange device 120 in connection with the dynamic provisioning of communication resources described herein. Such computer-executable instructions can be retained as a memory element labeled knowledge generation instruction(s) 418. In one aspect, as described herein, knowledge generation instruction(s) 418 can be stored as an implementation (e.g., a compiled instance) of one or more computer-executable instructions that implement and thus provide at least the functionality of the methods described herein. Knowledge generation instruction(s) 418 also can be transmitted across some form of computer readable media. It should be appreciate that different functionality instruction(s) can render physically alike network nodes into functionally different components (e.g., a server and a data manager unit), with functional differences dictated by logic (e.g., computer-executable instructions and data) specific to each one of such network nodes and defined by the knowledge generation instruction(s) 418. In an exemplary configuration in which the exchange device 120 embodies a server, the knowledge generation instruction(s) 418 can comprise or embody computer-accessible instructions that, in response to execution by a processor (e.g., a processor of the one or more processors 408), can permit the server to evaluate performance condition(s) of the server and retain a record of such condition(s) in memory.

Memory 416 can be embodied in a variety of computer-readable media. Exemplary computer-readable media can be any available media that is accessible by a processor in a computing device, such as one processor of the group of one or more processors 408, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be utilized to store the desired information and which can be accessed by a computer or a processor therein or functionally coupled thereto.

Memory 416 can comprise computer-readable non-transitory storage media in the form of volatile memory, such as random access memory (RAM), electrically erasable programmable read-only memory (EEPROM), and the like, or non-volatile memory such as read only memory (ROM). In one aspect, memory 416 can be partitioned into a system memory (not shown) that can contain data and/or programming modules that enable essential operation and control of the exchange device 120. Such program modules can be implemented (e.g., compiled and stored) in memory element 422, referred to as operating system (OS) instruction(s) 422, whereas such data can be system data that is retained in memory element 424, referred to as system data storage 424. The OS instruction(s) 422 and system data storage 424 can be immediately accessible to and/or are presently operated on by at least one processor of the group of one or more processors 408. The OS instruction(s) 422 can embody an operating system for the network node. Specific implementation of such OS can depend in part on architectural complexity of the exchange device 120. Higher complexity affords higher-level OSs. Example operating systems can include Unix, Linux, iOS, Windows operating system, and substantially any operating system for a computing device. In certain scenarios, the operating system embodied in OS instruction(s) 422 can have different levels of complexity based on particular configuration of the exchange device 120.

Memory 416 can comprise other removable/non-removable, volatile/non-volatile computer-readable non-transitory storage media. As an example, memory 416 can include a mass storage unit (not shown) which can provide non-volatile storage of computer code, computer readable instructions, data structures, program modules, and other data for the exchange device 120. A specific implementation of such mass storage unit (not shown) can depend on desired form factor of the exchange device 120 and space available for deployment thereof. For suitable form factors and sizes of the exchange device 120, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

Features of generation personalized options for consumption of media assets can be performed, at least in part, in response to execution of software components by a processor. The software components can include one or more implementations (e.g., encoding) of knowledge generation instruction(s) 418. In particular, yet not exclusively, to provide the specific functionality of the exchange device 120, a processor of the one or more processors 408 in the exchange device 120 can execute at least a portion of the computer-accessible instructions in knowledge generation instruction(s) 418.

In general, a processor of the group of one or more processors 408 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 408 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processors 408 can be implemented as a combination of computing processing units.

The one or more input/output (I/O) interfaces 404 can functionally couple (e.g., communicatively couple) the exchange device 120 to another functional element (component, unit, server, gateway node, repository, etc.) or network 160, for example. Functionality of the exchange device 120 that is associated with data I/O or signaling I/O can be accomplished in response to execution, by a processor of the group of one or more processors 408, of at least one I/O interface retained in memory element 428. Such memory element is represented by the block I/O interface(s) 428. In some embodiments, the at least one I/O interface embodies an API that permit exchange of data or signaling, or both, via an I/O interface of I/O interface(s) 404. In certain embodiments, the one or more I/O interfaces 404 can include at least one port that can permit connection of the exchange device 120 to other functional elements of the exemplary network environment 100. In one or more scenarios, the at least one port can comprise network adaptor(s) such as those present in reference links, and other network nodes. In other scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 404 can enable delivery of output (e.g., output data, output signaling)

to such functional elements. Such output can represent an outcome or a specific action of one or more actions described herein, such as the actions in the method of FIG. 4. Specific configurations, or deployments, of the one or more I/O interfaces 404 can include at least one HDMI.

In certain embodiments, the exchange device 120 can comprise a functionality specific platform (not shown) which can include one or more components the permit functionality of the exchange device 120. In one embodiment, a component of the one or more components can be a firmware component which can have dedicated resources (e.g., a processor, software, etc.) to implement certain functions that support implementation of or implement at least part of the functionality of the exchange device 120. In another embodiment, the functionality specific platform (not shown) can include at least a portion of the one or more processors 408 which can be dedicated to execution of a part or all of the knowledge instruction(s) 418, thus relieving at least some of the computational load from the one or more processors 408 for other operation of the exchange device 120.

Bus 412 represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB), and the like.

Figure 5:
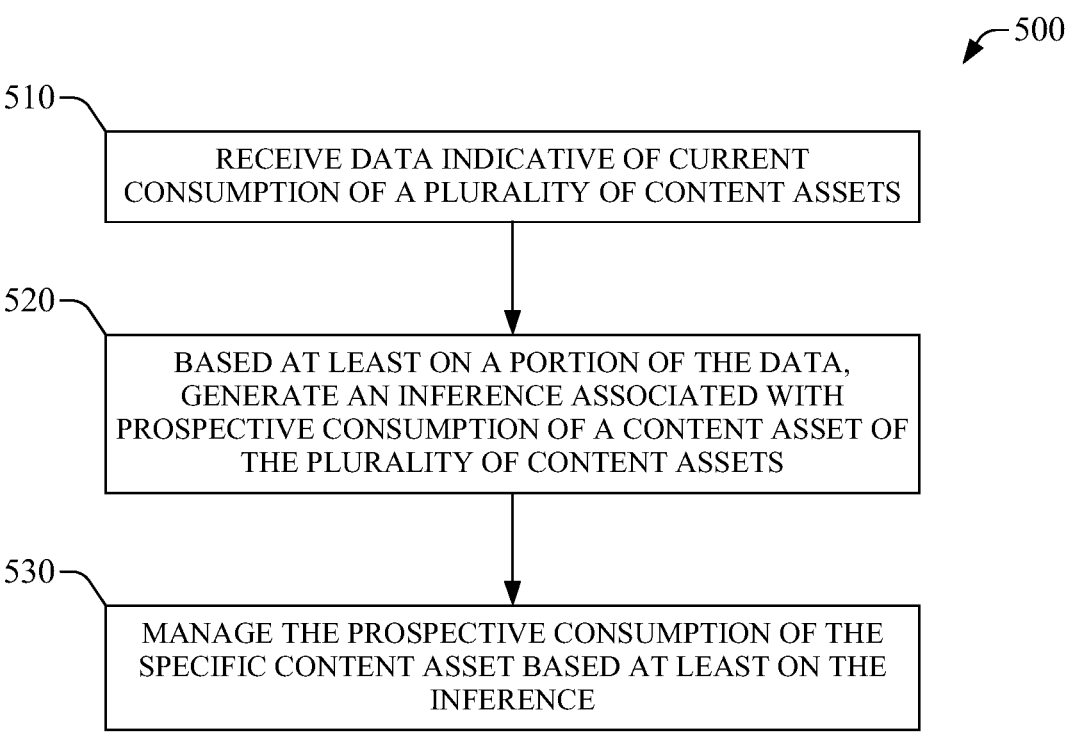
Figure 7:
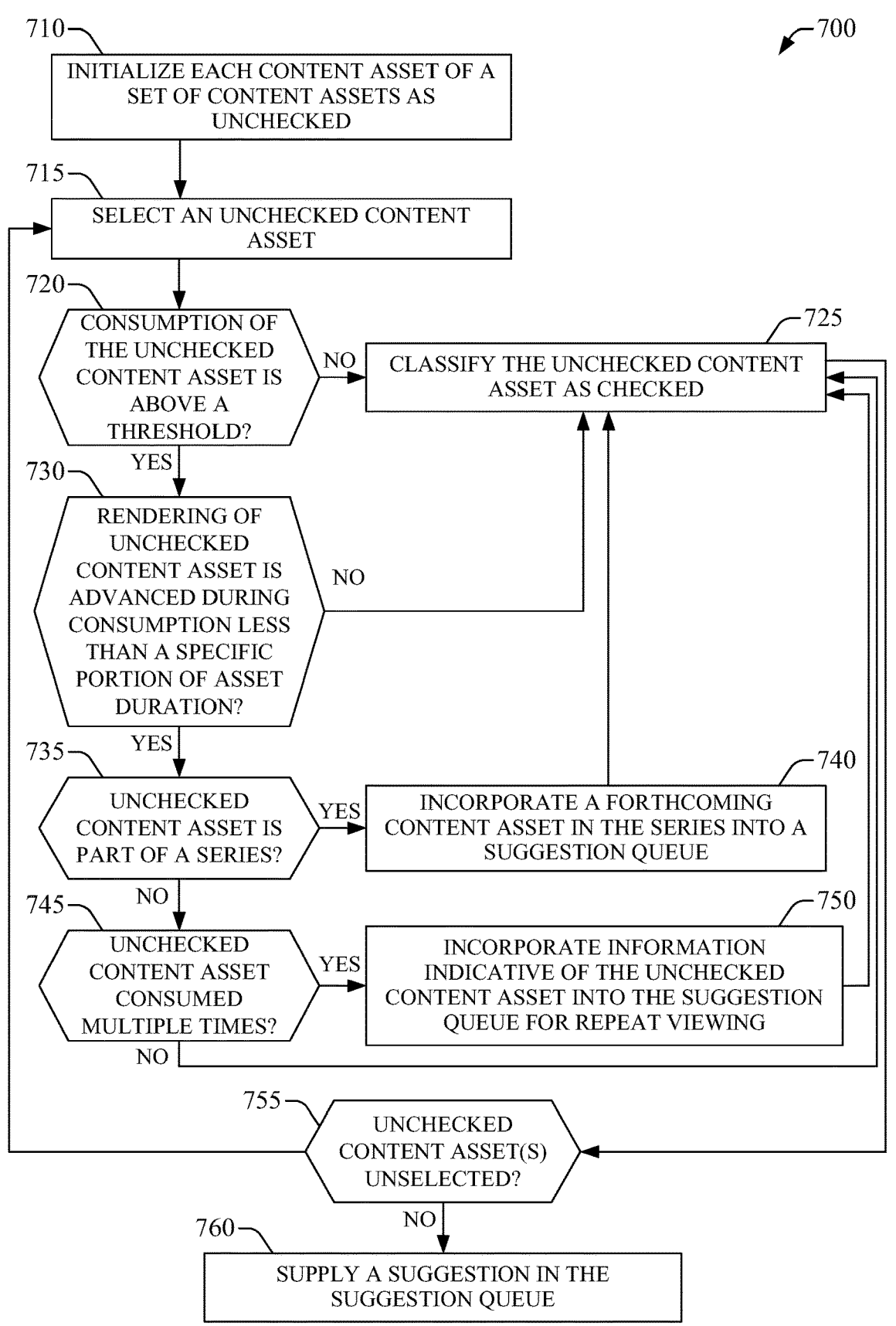

In view of the various aspects of generating personalized options for consumption of media assets comprising linear-programming assets or recorded media assets, such as those described herein, exemplary methods that can be implemented in accordance with the disclosure can be better appreciated with reference to the exemplary flowcharts in FIGS. 5-7. For simplicity of explanation, the exemplary methods disclosed herein are presented and described as a series of actions (also referred to as steps), pictorially represented with a block. However, it is to be understood and appreciated that implementation, and related advantages, of such methods is not limited by the order of actions, as some actions may occur in different orders and/or concurrently with other actions from that shown and described herein. For example, the various methods (also referred to as processes) of the disclosure can be alternatively represented as a series of interrelated states or events, such as in a state diagram. Moreover, when disparate functional elements (network nodes, units, etc.) implement different portions of the methods of the disclosure, an interaction diagram or a call flow can represent such methods or processes. Furthermore, not all illustrated actions may be required to implement a method in accordance with the subject disclosure.

The method(s) disclosed throughout the subject specification and annexed drawings can be stored on an article of manufacture, or computer-readable storage medium, to facilitate transporting and transferring such methods to computing devices (e.g., desktop computers, mobile computers, mobile telephones, and the like) for execution, and thus implementation, by a processor or for storage in a memory.

FIG. 5 is a flowchart of an exemplary method 500 for handling (e.g., processing, transmitting, and/or consuming) content in accordance with one or more aspects of the disclosure. The exemplary method 500 can be implemented (e.g., performed or executed) by one or more computing devices (e.g., exchange device 120), or a processor therein or functionally coupled thereto. At block 510, data indicative of current consumption of content, such as a plurality of content assets, is received. Such block can be referred to as a receiving action. As described herein, the plurality of content assets can comprise one or more linear-programming content assets or one or more time-shifted, e.g., recorded, content assets (e.g., one or more video-on-demand (VOD) assets, one or more network-stored VOD (nVOD) assets, or the like). In one aspect, the receiving action can comprise receiving data indicative of rendering (display, rewind, pause, etc.) of a linear-programming media asset. In another aspect, the receiving action can comprise receiving data indicative of playback of a recorded content asset.

At block 520, an inference associated with prospective consumption of a content asset of the plurality of content assets is generated based at least on a portion of the data received at block 510. In one embodiment, the knowledge generation unit 128 can generate the inference. Block 520 can be referred to as a generating action and, in one aspect, can comprise classifying the data into at least two categories of data. As described herein, in certain embodiments, the at least two categories of data can comprise a first category of data suitable for inferring the prospective consumption of the content asset and a second category of data unsuitable for inferring the prospective consumption of the specific content asset. As described herein, the first category of data is indicative of end-user consumption behavior over a period of time (e.g., a consumption trend) and can comprise the portion of the data utilized for generation of the inference.

As described herein, classifying the data received at block 510 in such categories can permit discriminating data into data that contains behavioral information of a consumer of a content asset and data that represents operation of a device rendering one or more of the content assets of the plurality of content assets. In one aspect, classifying the received data into the second category of data can comprise determining that an interface (e.g., one of I/O interface(s) 112) contained in or functionally coupled to a device for rendering the specific content asset (e.g., rendering device 110) is switched off for a specific period, and assigning at least a portion of the data received during the specific period to the second category of data.

At block 530, the prospective consumption of the content asset is managed based at least on the inference generated at block 520. Block 530 can be referred to as a managing action. In one aspect, the managing action can comprise providing a notification that a specific linear-programming asset is available for consumption. In another aspect, the managing action also can comprise prompting an end-user, as part of the notification, to consume the linear-programming asset. The managing action can administer consumption features of time-shifted, e.g., recorded, content assets. In one administration scenario, the managing action can comprise assigning a playback priority to a recorded content asset based at least on the inference generated at block 520. In such scenario, the inference relied on, at least in part, can be an inference of likelihood of playback of the recorded content asset. In one aspect, assigning the playback priority can comprise configuring the playback priority in a device that retains the recorded content asset, such as exchange device 120. For instance, configuring the playback priority can include configuring metadata associated with a data structure containing the recorded content asset. In another additional or alternative aspect, assigning the playback priority can comprise providing (e.g., generating and commu-nicating) a notification of the playback priority. In yet another additional or alternative aspect, the managing action can comprise a recording, or scheduling, priority. In a further aspect or alternative aspect, the managing action can com-prise assigning a deletion priority to the recorded content asset based at least on the inference generated at block 520. Such inference can be, for example, the inference of likeli-hood of playback of the recorded content asset. In another implementation, similarly to administration of playback priorities, assigning the deletion priority to the recorded content asset can include providing a notification of the deletion priority, wherein assigning such deletion priority can include configuring the deletion priority in a device that retains the recorded content asset.

As described herein, block 520 can comprise classifying the data into at least a first category of data suitable for inferring the prospective consumption of the content asset and a second category of data non-suitable for inferring the prospective consumption of the specific content asset. In certain scenarios, exemplary method 600 in FIG. 6 can embody block 520. Accordingly, it should be appreciated that the exemplary method 600 is an exemplary method for classifying data associated with consumption of content assets into a category of data suitable for generating an inference of prospective consumption of content assets in accordance with one or more aspects of the disclosure. In certain embodiments, the computing device that can imple-ment the exemplary method 400 also can implement the exemplary method 600. At block 610, data indicative of consumption of a content asset is received. In one imple-mentation, such block can be at least a portion of block 410. At block 620, it is determined if a rendering device (e.g., rendering device 110) is turned on. In one embodiment, such determination can be made by monitoring signaling from an HDMI (e.g., one of I/O interface(s)) included in the render-ing device. In a scenario in which the rendering device is not turned on, at block 630, the data indicative of consumption of the content asset is classified as non-suitable for gener-ating an inference of prospective consumption of the content asset. In a scenario in which the rendering device is turned on, flow is directed to block 640, at which it is determined if the content asset is consumed to at least a predetermined extent (e.g., 90% of the content asset has been consumed). In one embodiment, a level of consumption of the content asset can be extracted from at least signaling (e.g., control input 104) received from the HDMI included in the render-ing device, such signaling received at another I/O interface in the rendering device.

In a scenario in which the content asset is not consumed to at least the predetermined extent, flow is directed to block 630. Yet, in the converse scenario, flow is directed to block 650 at which it is determined if a participation level fulfills a presence criterion. In one aspect, the presence criterion can establish one or more specific types and/or levels of infor-mation (data, metadata, and/or signaling) indicative of the content asset being consumed (e.g., an end-user is watching a recorded movie) that can be available in order to establish, at least in part, that the content asset is actively consumed. For example, one of such types of information can comprise changes in volume of audio associated with the content asset. For another example, another one of such types of information can comprise switching a channel that is being tuned. For yet another example, yet another one of such types of information can comprise one or more of fast-forwarding, rewinding, or pausing the content asset. As described herein, the information indicative of the content asset being consumed can be extracted, at least in part, from control information (e.g., control input 104) received at the rendering device. For a participation level fulfilling the presence criterion, the flow is directed to block 660, at which the data indicative of consumption of the content asset is classified as data suitable for generating an inference of prospective consumption of the content asset.

FIG. 7 illustrates a flowchart of an exemplary method 700 for providing a viewing suggestion queue according to one or more aspects of the disclosure. In certain scenarios, the exemplary method 700 can embody block 520. While illus-trated with a viewing suggestion queue (also referred to as a suggestion queue), the exemplary method 700 can be carried out for generation of any inference associated with consumption of a content asset. In certain embodiments, the computing device or the processor functionally coupled thereto can implement the exemplary method 400, and also may implement the subject exemplary method 700. At block 710, each content asset of a set of one or more content assets is initialized, or initially treated, as unchecked. At block 715, an unchecked content asset is selected. In one embodiment, the management unit 132 can perform blocks 710 and 715, referred to as an initializing action. In another embodiment, the knowledge generation unit 128 can perform such blocks.

At block 720 it is determined if consumption (e.g., rendering) of the unchecked content asset is above a first threshold (e.g., 85% of total duration of asset). In one aspect, the first threshold can be configurable or statically deter-mined (e.g., hardcoded into the operation of knowledge generation unit 128). In response to consumption being at or below the first threshold, the unchecked content asset is classified as checked at block 725. In response to consump-tion being above the first threshold, it is determined at block 730 if rendering of the unchecked content asset is advanced (e.g., fast-forwarded), during consumption, for a net time interval (e.g., cumulative period of one or more fast-forward events) that is less than a specific portion (e.g., 25%) of duration of such asset. In the negative case, flow is directed to block 725. Yet, in response to the unchecked content asset being fast-forwarded for a net time interval greater than or equal to the specific portion of the duration of the unchecked content asset, flow is directed to block 735 at which it is determined if such asset is part of a series (e.g., a premium television season of several episodes). An affirmative deter-mination results in flow being directed to block 740, at which information indicative of a forthcoming content asset in the series is added to a suggestion queue. In one aspect, the suggestion queue can be contained in the one or more inferences 137. In the alternative, in response to the unchecked content asset not being part of a series, it is determined if such asset is consumed several times. In the affirmative case, information indicative of the unchecked content asset is incorporated into the suggestion queue for repeat viewing. In one embodiment, the knowledge genera-tion unit 128 can perform one or more of blocks 720 through 750.

Upon or after implementation of block 725, flow is directed to block 755 at which it is determined if one or more unchecked content assets remain unselected. An affirmative determination leads to block 715, whereas a negative deter-mination leads to block 760 at which a suggestion in the suggestion queue is supplied, for example, to a device, which can be an end-user device or any device functionally coupled (e.g., communicatively coupled) to the computing device that performs the subject exemplary method 700. Block 760 can be referred to as a supplying action and, in one aspect, can comprise transmitting information (e.g., data and/or metadata) indicative of the suggestion. It should appreciated that the suggestion is one example of an inference that can be generated by the exchange device 120, via the knowledge generation unit, for example, according to one or more aspects described herein. In one embodiment, the management unit 132 can perform blocks 755 and knowledge generation unit 128 can perform block 760.

In view of the subject specification and annexed drawings, when compared with conventional technologies for generation of options for consumption of content (e.g., media assets), various advantages of the disclosure over such technologies emerge. For example, the disclosure can provide options for automated administration of consumption of recorded assets being stored locally and/or remotely in a network repository.

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A computer-implemented method, comprising:
determining that a consumed portion of a first media asset exceeds a first threshold amount;
determining that an amount of time that the first media asset was advanced during the consumption of the first media asset does not exceed a second threshold amount;
based at least in part on determining that the consumed portion of the first media asset exceeds the first threshold amount, and on determining that the amount of time that the first media asset was advanced during the consumption of the first media asset does not exceed the second threshold amount, identifying a second media asset that is similar to the first media asset; and
providing a recommendation of the second media asset.

2. The method of claim 1, wherein determining the amount of time that the first media asset was advanced during the consumption of the first media asset comprises determining a net amount of time that the first media asset was fast-forwarded during one or more fast-forwarding events that occurred during the consumption of the first media asset.

3. The method of claim 1, further comprising:
determining whether the first media asset is part of a series; and
providing, as the recommended second media asset, a media asset also included in the series.

4. The method of claim 3, wherein the series comprises a plurality of episodes, the first media asset being a first episode of the series and the second media asset being a second episode of the series.

5. The method of claim 1, wherein providing the recommendation of the second media asset comprises:
accessing a suggestion queue comprising a plurality of media assets; and
providing, as the recommended second media asset, a media asset of the plurality of media assets.

6. The method of claim 1, further comprising:
determining whether the first media asset was consumed multiple times; and
wherein the providing of the recommendation of the second media asset is further performed based at least in part on determining that the first media asset was consumed multiple times.

7. The method of claim 1, wherein determining that the consumed portion of the first media asset exceeds the first threshold amount comprises determining that at least a threshold percentage of the first media asset was consumed.

8. The method of claim 1, wherein determining that the amount of time that the first media asset was advanced during the consumption of the first media asset does not exceed the second threshold amount comprises determining that less than a threshold percentage of the first media asset was advanced during the consumption of the first media asset.

9. A computer-implemented system, comprising:
memory;
control circuitry configured to:
determine that a consumed portion of a first media asset exceeds a first threshold amount based on an indication stored in the memory;
determine that an amount of time that the first media asset was advanced during the consumption of the first media asset does not exceed a second threshold amount;
based at least in part on determining that the consumed portion of the first media asset exceeds the first threshold amount, and on determining that the amount of time that the first media asset was advanced during the consumption of the first media asset does not exceed the second threshold amount, identify a second media asset that is similar to the first media asset; and
provide a recommendation of the second media asset.

10. The system of claim 9, wherein, to determine the amount of time that the first media asset was advanced during the consumption of the first media asset, the control circuitry is further configured to determine a net amount of time that the first media asset was fast-forwarded during one or more fast-forwarding events that occurred during the consumption of the first media asset.

11. The system of claim 9, wherein the control circuitry is further configured to:
determine whether the first media asset is part of a series; and provide as the recommended second media asset a media asset also included in the series.

12. The system of claim 11, wherein the series comprises a plurality of episodes, the first media asset being a first episode of the series and the second media asset being a second episode of the series.

13. The system of claim 9, wherein, to provide the recommendation of the second media asset, the control circuitry is further configured to:

access a suggestion queue comprising a plurality of media assets; and provide, as the recommended second media asset, a media asset of the plurality of media assets.

14. The system of claim 9, wherein the control circuitry is further configured to:

determine whether the first media asset was consumed multiple times, and provide the recommendation of the second media asset further based at least in part on determining that the first media asset was consumed multiple times.

15. The system of claim 9, wherein the control circuitry, to determine that the consumed portion of the first media asset exceeds the first threshold amount, is further configured to determine that at least a threshold percentage of the first media asset was consumed.

16. The system of claim 9, wherein the control circuitry, to determine the amount of time that the first media asset was advanced during the consumption of the first media asset does not exceed the second threshold amount, is further configured to determine that less than a threshold percentage of the first media asset was advanced during the consumption of the first media asset.

17. A computer-implemented system, comprising:

memory;

control circuitry configured to:

determine whether a consumed portion of a first media asset exceeds a first threshold amount based on an indication stored in the memory; and determine whether an amount of time that the first media asset was advanced during the consumption of the first media asset exceeds a second threshold amount;

in response to the control circuitry determining that the consumed portion of the first media asset exceeds the first threshold amount and the amount of time that the first media asset was advanced during the consumption of the first media asset does not exceed the second threshold amount, identify a second media asset that is similar to the first media asset and provide a recommendation of the second media asset; and in response to the control circuitry determining that the consumed portion of the first media asset does not exceed the first threshold amount, or that the amount of time that the first media asset was advanced during the consumption of the first media asset exceeds the second threshold amount, identify a third media asset and provide a recommendation of the third media asset.

18. The system of claim 7, wherein the third media asset is not similar to the first media asset.

19. A computer-implemented method, comprising:

receiving, by a computing device, data indicative of current consumption of at least one of a plurality of media assets, wherein a portion of the data indicates an interaction by a user with the at least one of the plurality of media assets and indicates repeated consumption of the at least one of the plurality of media assets by the user;

determining, by the computing device based on the portion of the data, a predictive inference regarding a likelihood of consumption by the user, at a future point in time, of the at least one of the plurality of media assets repeatedly consumed by the user; and managing, by the computing device based on the predictive inference, prospective consumption of the at least one of the plurality of media assets repeatedly consumed by the user.

20. The method of claim 19, further comprising:

generating a storage configuration for the at least one of the plurality of media assets repeatedly consumed by the user; and incorporating, into a suggestion queue for repeat viewing, information indicative of the at least one of the plurality of media assets repeated consumed by the user.

* * * * *